US012793324B2

(12) United States Patent
Sato

(10) Patent No.: US 12,793,324 B2
(45) Date of Patent: Nov. 10, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Tomokazu Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 18/650,239

(22) Filed: Apr. 30, 2024

(65) Prior Publication Data

US 2024/0378795 A1 Nov. 14, 2024

(30) Foreign Application Priority Data

May 11, 2023 (JP) ................................ 2023-078633

(51) Int. Cl.
*G06T 15/08* (2011.01)
*G06T 7/90* (2017.01)
*G06T 15/20* (2011.01)
*G06T 19/20* (2011.01)

(52) U.S. Cl.
CPC ................ *G06T 15/08* (2013.01); *G06T 7/90* (2017.01); *G06T 15/205* (2013.01); *G06T 19/20* (2013.01); *G06T 2207/10024* (2013.01); *G06T 2207/20081* (2013.01); *G06T 2219/2012* (2013.01)

(58) Field of Classification Search
CPC ......... G06T 15/08; G06T 15/205; G06T 7/90; G06T 19/20; G06T 2207/10024; G06T 2207/20081; G06T 2219/2012
USPC .......................................................... 345/424
See application file for complete search history.

(56) References Cited

U.S. PATENT DOCUMENTS 11,308,659 B2 4/2022 Duckworth et al.
11,481,910 B2 10/2022 Shiraishi et al.
11,823,400 B2 11/2023 Shiraishi et al.
2011/0038529 A1* 2/2011 Utsugi ...................... G06T 3/04 382/154
2011/0091116 A1* 4/2011 Yano .................... G06V 10/443 382/209
2019/0362539 A1* 11/2019 Kurz ......................... G06T 7/40
2020/0005476 A1* 1/2020 Nishiyama .............. G06T 7/593
2022/0109795 A1* 4/2022 Tsunoda ................. H04N 23/90
2022/0345522 A1* 10/2022 Kolar .................. H04L 67/1021
(Continued)

OTHER PUBLICATIONS

Mildenhall, B. et al., "NeRF: Representing Scenes as Neural Radiance Fields for View Synthesis" arXiv:2003.08934v2 (Aug. 2020) pp. 1-25.
(Continued)

*Primary Examiner* — Jin Ge
(74) *Attorney, Agent, or Firm* — Carter, DeLuca & Farrell LLP

(57) ABSTRACT

To perform leaning for generating an image or the like corresponding to a virtual viewpoint from multi-viewpoint images at a higher speed. Shape data representing a three-dimensional shape of an object is generated based on a plurality of captured images obtained by a plurality of image capturing devices. Then, a learning area is set for each object based on the generated shape data and a three-dimensional field in accordance with a captured image is learned by taking the learning area set for each object as a target.

21 Claims, 20 Drawing Sheets

(56) References Cited

U.S. PATENT DOCUMENTS

| | | | | |
|---|---|---|---|---|
| 2022/0381558 | A1* | 12/2022 | Round | G01B 11/245 |
| 2023/0202030 | A1* | 6/2023 | Masumura | B25J 19/023<br>700/250 |
| 2024/0096001 | A1* | 3/2024 | Sajjadi | G06N 3/0455 |
| 2024/0371081 | A1* | 11/2024 | Matthews | G06T 15/20 |

OTHER PUBLICATIONS

Kondo, N. et al., "VaxNeRF: Revisiting the Classic for Voxel-Accelerated Neural Radiance Field" arXiv:2111.13112v1 (Nov. 2021) pp. 1-15.

* cited by examiner

ROUGH VOXEL GRID

FINE VOXEL GRID

TRILINEAR INTERPOLATION

IMAGE PROCESSING APPARATUS, IMAGE PROCESSING METHOD, AND STORAGE MEDIUM

BACKGROUND

Field

The present invention relates to an image processing technique to generate data corresponding to a virtual viewpoint from multi-viewpoint images.

Description of the Related Art

There is a technique called NeRF (Neural Radiance Fields) generating an image corresponding to an arbitrary virtual viewpoint by taking multi-viewpoint images whose camera parameters are already known as an input ("Ben Mildenhall, Pratul P. Srinivasan, Matthew Tancik, Jonathan T. Barron, Ravi Ramamoorthi, and Ren Ng. NeRF: Representing Scenes as Neural Radiance Fields for View Synthesis. 3 Aug. 2020.", U.S. Pat. No. 11,308,659). This NeRF is a neural network outputting a volume density σ and emitted radiance from a five-dimensional input variable {arbitrary spatial position coordinates (x, y, z) and direction (θ, φ)}. In the learning of this neural network, the pixel values of multi-viewpoint images are taken as correct pixel values and the difference from the pixel value of rendering results is taken as a loss. Consequently, in the learning process, drawing (rendering), loss calculation, and error backpropagation are performed the number of times corresponding to the number of images included in the multi-viewpoint images and further, these pieces of processing are repeated, and therefore, much time is necessary for the learning. For example, in order to learn a scene in which a 1K image with 100 viewpoints is taken as a correct image, it is known that at least 12 hours or more are necessary. For the problem such as this requiring much time for learning, the method called VaxNeRF or the like has been proposed, which makes attempts to increase the speed by utilizing the visual hull method (see "Naruya Kondo, Yuya Ikeda, Andrea Tagliasacchi, Yutaka Matsuo, Yoichi Ochiai, Shixiang Shane Gu. VaxNeRF: Revisiting the Classic for Voxel-Accelerated Neural Radiance Field. Nov. 25, 2021"). The visual hull method is a method of obtaining a three-dimensional shape of an object extracted from multi-viewpoint images by performing back projection of the silhouette of the object onto a three-dimensional space, configuring a pyramid-like body (including a body whose base is not a square) from each viewpoint, and finding the intersecting portions of each pyramid-like body. This visual hull method has a feature that on the assumption the extracted silhouette is correct, it is guaranteed that no object exists outside the obtained three-dimensional shape. By utilizing this feature, in VaxNeRF, the amount of calculation at the time of learning is suppressed and the speed of learning is increased by limiting the sampling points at the time of rendering to within the three-dimensional shape obtained by the visual hull method as well not utilizing the pixel located outside the silhouette for learning.

For example, in a case or the like where a scene is taken as a target, in which many objects are distributed sparsely in a wide image capturing area, such as a game of soccer, even by the method of VaxNeRF, a huge amount of time is still necessary for learning.

SUMMARY

The present invention has been made in view of the above-described problem and an object is to perform learning for generating an image or the like corresponding to a virtual viewpoint from multi-viewpoint images at a higher speed.

The image processing apparatus according to the present invention is an image processing apparatus including: one or more memories storing instructions; and one or more processors executing the instructions to perform: obtaining a plurality of captured images obtained by a plurality of imaging devices; generating rough shape data representing a three-dimensional shape of an object based the obtained plurality of captured images; setting a learning area for each object based on the generated rough shape data; and learning a three-dimensional field in accordance with the captured image for obtaining virtual viewpoint data or a three-dimensional shape of an object corresponding to a virtual viewpoint from the plurality of captured images by taking the learning area set for each object as a target.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

In the following, the present embodiments are explained with reference to the drawings. The following embodiments do not necessarily limit the present invention. Further, all combinations of features explained in the present embodiments are not necessarily indispensable to the solution of the present invention. Furthermore, as the way of thinking common to each embodiment, in the present invention, a rough three-dimensional shape (rough shape) of an object is utilized as in VaxNeRF. Then, the three-dimensional field (this "field" is different depending on learning contents. In the following, this is described as "three-dimensional field" in the present specification) within the learning-target image capturing space is defined independently for each object and learning is performed. Due to this, the amount of information each three-dimensional field has is reduced and the convergence of learning for each three-dimensional field is expedited, and thereby, high-speed learning is implemented.

First Embodiment

<Configuration of Image Processing System>

Figure 1:
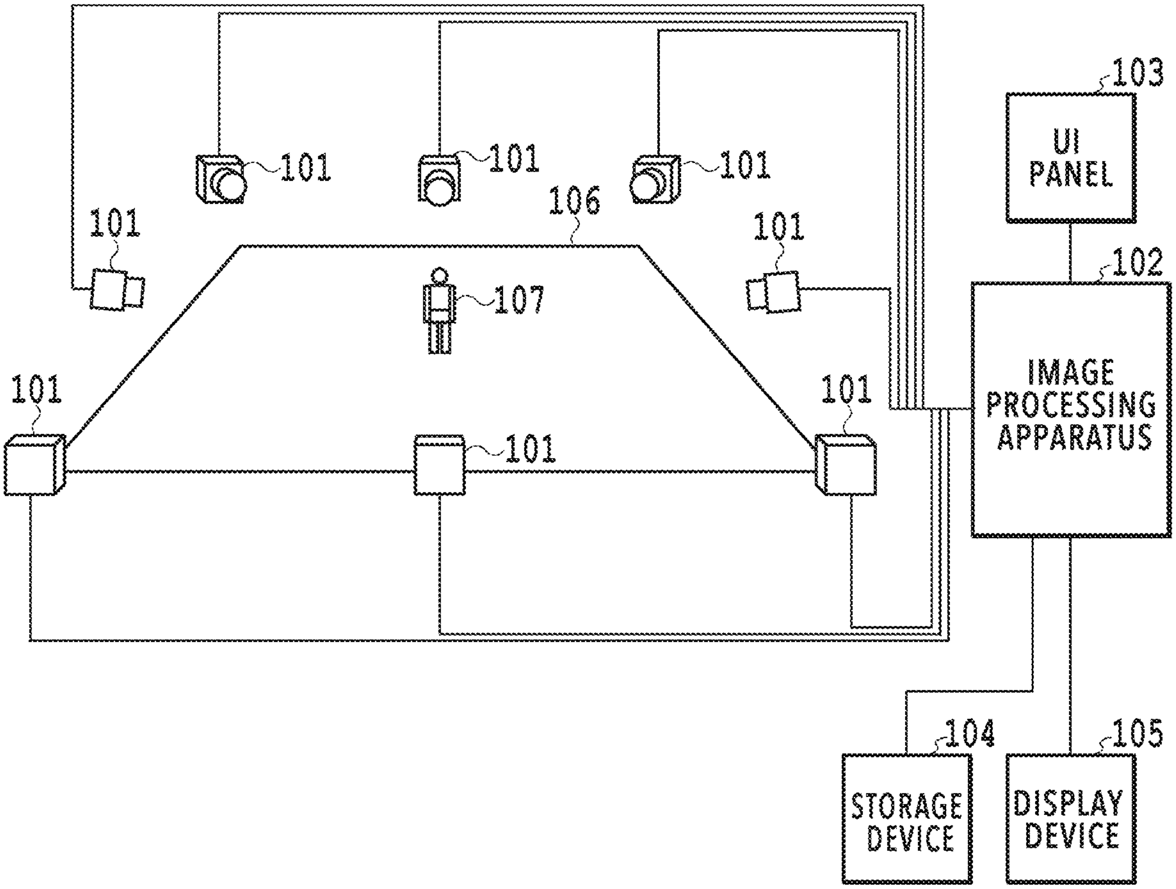
FIG. 1 is a diagram showing a configuration example of an image processing system.

FIG. 1 is a diagram showing a configuration example of an image processing system performing generation of a virtual viewpoint image according to the present embodiment. The image processing system has a plurality of imaging devices (cameras) 101, an image processing apparatus 102, a user interface (UI) panel 103, a storage device 104, and a display device 105. The plurality of the cameras 101 performs synchronous image capturing for an object 107 existing inside of an image capturing area 106 from multiple viewpoints in accordance with image capturing conditions and obtains data of a plurality of captured images (multi-viewpoint images) corresponding to each viewpoint. The captured image obtained by the camera 101 may be a still image or a moving image, or may be both still image and moving image. In the present embodiment, unless described particularly, it is assumed that the term "image" includes both still image and moving image. The image processing apparatus 102 controls the plurality of the cameras 101 and generates three-dimensional shape data (3D model) of the object 107 based on a plurality of captured images obtained from the plurality of the cameras 101. The UI panel 103 is a display device, such as a liquid crystal display, and functions as a user interface for informing a user of the current image capturing conditions and processing settings. Further, the UI panel 103 may comprise an input device, such as a touch panel or a button, and may receive instructions from a user about the image capturing conditions and processing settings. The input device may be provided separately from the UI panel 103, such as a mouse and a keyboard. The storage device 104 stores three-dimensional shape data of an object, which is obtained from the image processing apparatus 102. The display device obtains three-dimensional shape data of the object from the image processing apparatus 102 and displays the three-dimensional shape data. The image capturing area 106 is a space (three-dimensional space) surrounded by the plurality of the cameras 101 installed within a studio and the frame indicated by a solid line indicates the contour in the longitudinal direction and the horizontal direction of the image capturing area 106 on the floor surface.

<Hardware Configuration of Image Processing Apparatus>

Figure 2:
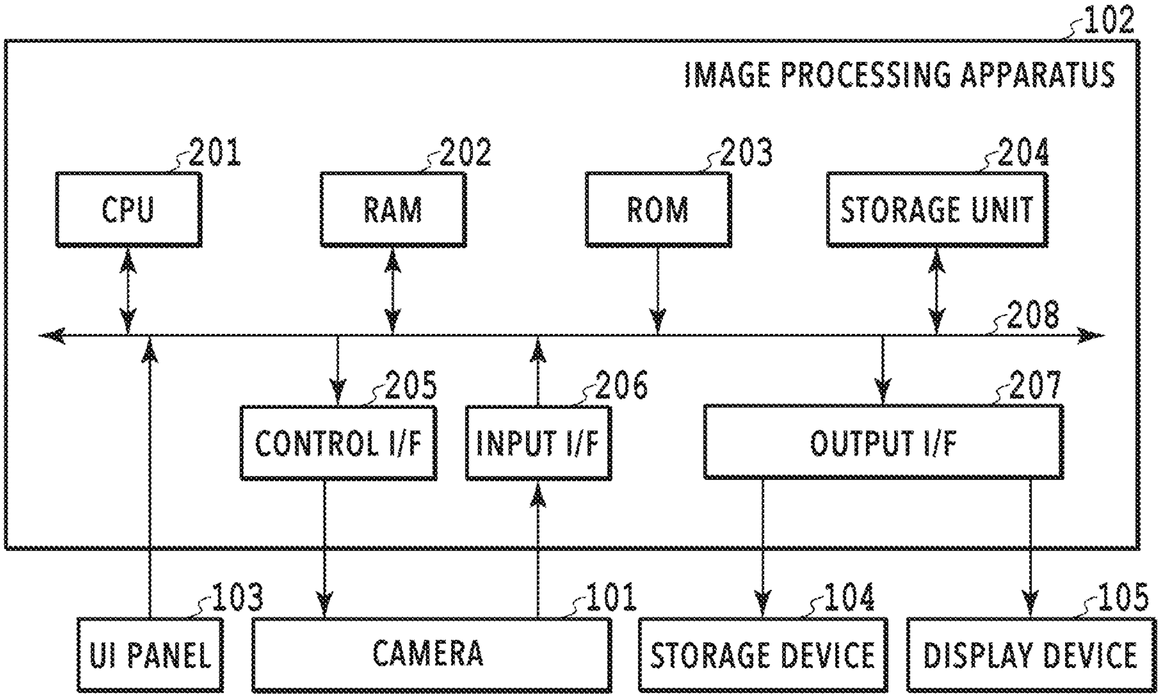
FIG. 2 is a diagram showing a hardware configuration example of an image processing apparatus.

FIG. 2 is a diagram showing a hardware configuration example of the image processing apparatus 102. The image processing apparatus 102 has a CPU 201, a RAM 202, a ROM 203, a storage unit 204, a control interface (I/F) 205, an input interface (I/F) 206, an output interface (I/F) 207, and a main bus 208. The CPU 201 is a processor comprehensively controlling each unit of the image processing apparatus 102. The RAM 202 functions as a main memory, a work area and the like of the CPU 201. The ROM 203 stores a program group executed by the CPU 201. The storage unit 204 stores applications executed by the CPU 201, data used for image processing, and the like. The control (I/F) 205 is connected with the plurality of the cameras 101 and is an interface for performing the setting of image capturing conditions and control of the starting of image capturing, the stopping of image capturing and the like. The input I/F 206 is a serial bus interface, such as SDI and HDMI (registered trademark), and obtains multi-viewpoint image data from the plurality of the cameras 101 via the input I/F 206. The output I/F 207 is a serial bus interface, such as USB and IEEE 1394, and via the output I/F 207, an object shape is output to the storage device 104 and the display device 105. The main bus 208 is a transmission path connecting each module of the image processing apparatus 102.

In the present embodiment, by using eight cameras installed in a studio, one or a plurality of objects is captured from the periphery. Further, it is assumed that camera parameters, such as intrinsic parameters, extrinsic parameters, and distortion parameters of the cameras, are stored in the storage unit 204. The intrinsic parameters represent the coordinates of the image center and the lens focal length and the extrinsic parameters represent the position and orientation of the camera. It is not necessary for the camera parameters of the plurality of the cameras to be common to all the cameras and for example, the viewing angle may be different.

<Operation of Image Processing Apparatus>

Figure 3A:
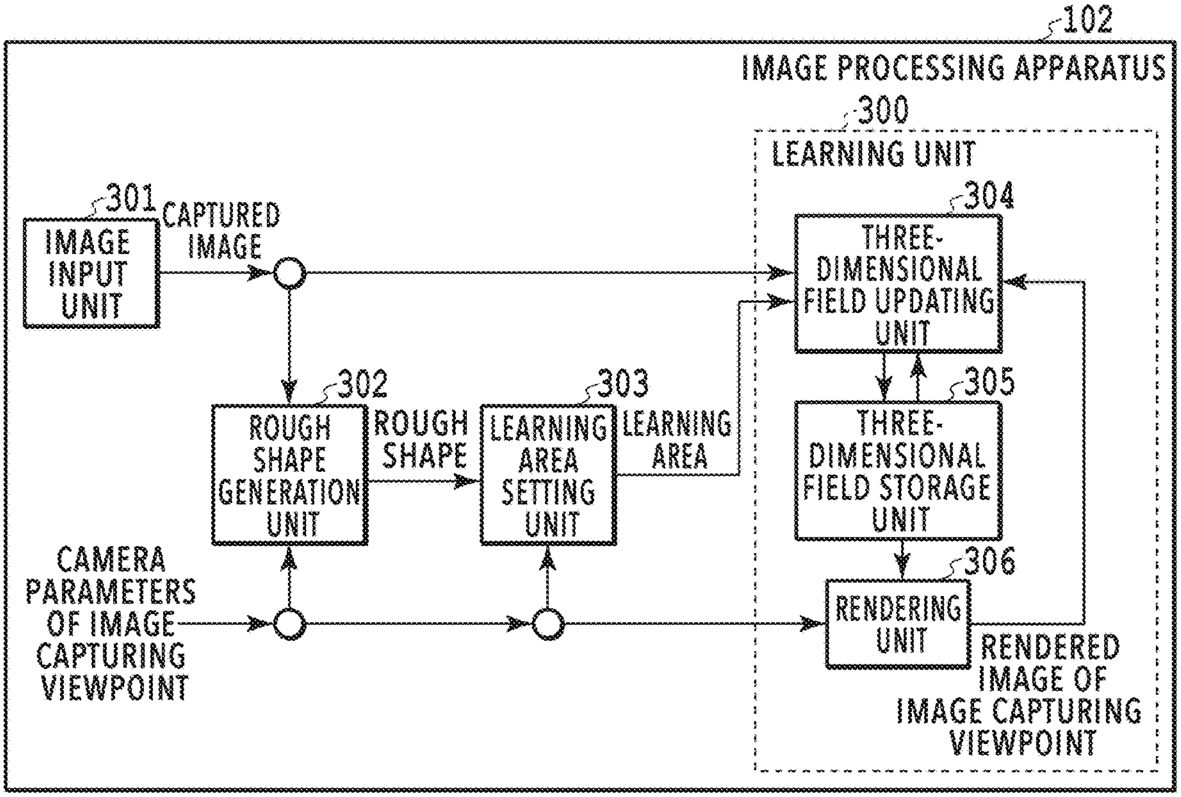
FIG. 3A is a block diagram showing a function configuration of the image processing apparatus and FIG. 3B is a block diagram showing a function configuration of another processing apparatus.
Figure 4:
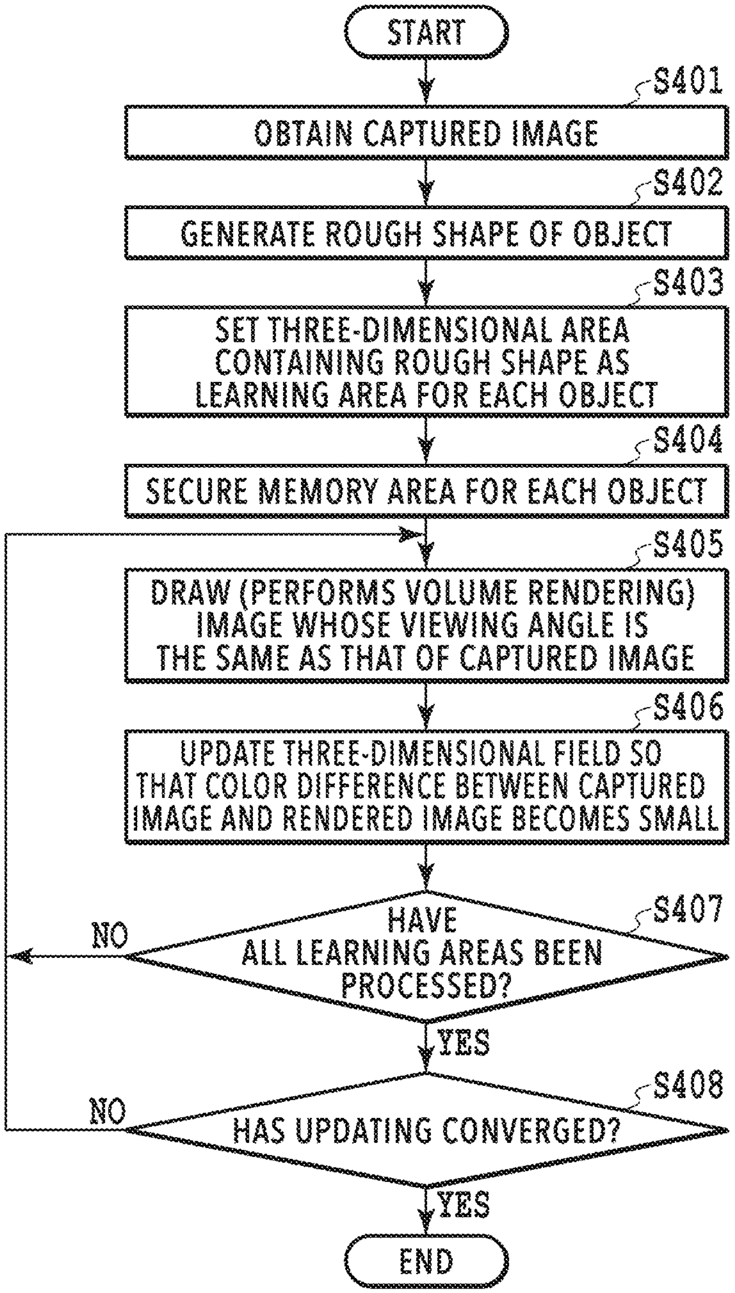
FIG. 4 is a flowchart showing a flow of the operation of an image processing apparatus according to a first embodiment.

Following the above, the operation of the image processing apparatus 102 according to the present embodiment is explained. FIG. 3A is a block diagram showing the function configuration in the learning phase of the image processing apparatus 102 and FIG. 4 is a flowchart showing a flow of the operation of the image processing apparatus 102. As shown in FIG. 3A, the image processing apparatus 102 has a learning unit 300, an image input unit 301, a rough shape generation unit 302, and a learning area setting unit 303. Then, the learning unit 300 has a three-dimensional field updating unit 304, a three-dimensional field storage unit 305, and a rendering unit 306. In the following, along the flowchart in FIG. 4, the operation of each unit of the image processing apparatus 102 is explained. In the following explanation, a symbol "S" means a step. In a case where the input captured image is a moving image, the series of processing shown in the flowchart in FIG. 4 is performed for each frame.

At S401, the image input unit 301 receives and obtains multi-viewpoint images from the plurality of the cameras 101 via the input I/F 206. Alternatively, it may also be possible for the image input unit 301 to read and obtain the data of multi-viewpoint images stored in the storage unit 204. The obtained multi-viewpoint images are stored in the RAM 202.

Figure 5:
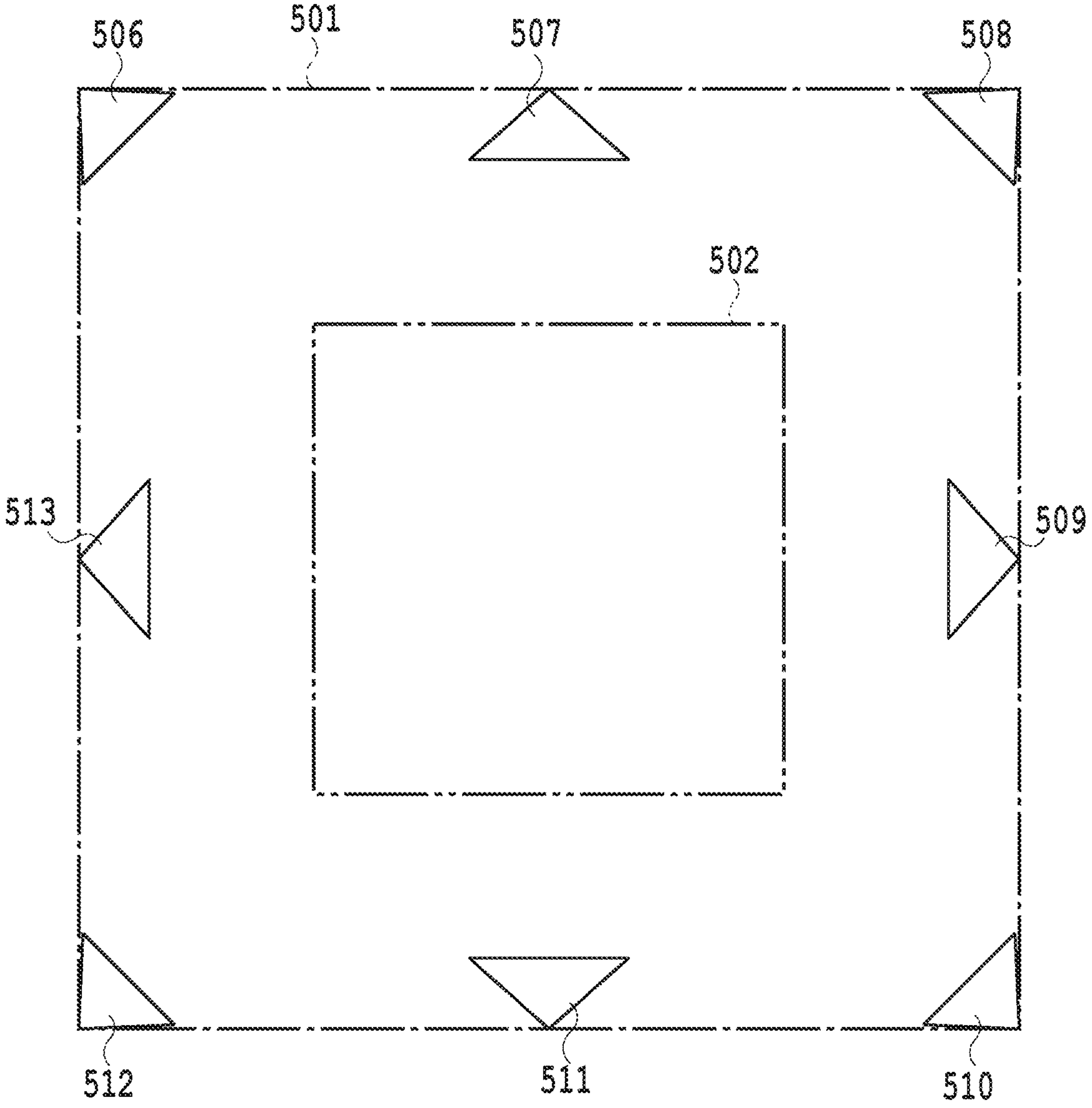
FIG. 5 is a diagram showing an image capturing area two-dimensionally from above.
Figure 6:
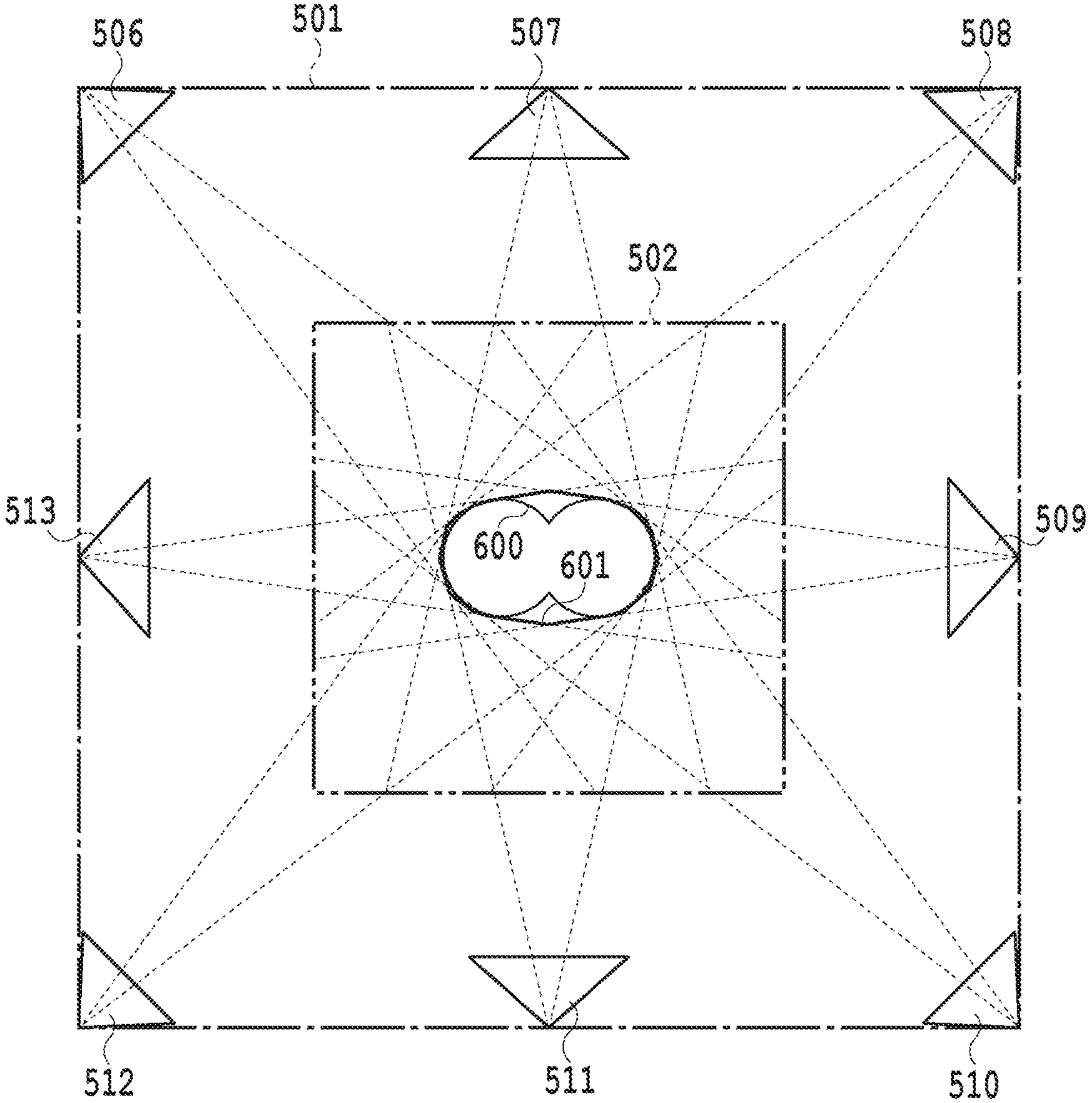
FIG. 6 is a diagram explaining obtaining of a rough shape using the visual hull method.

At S402, the rough shape generation unit 302 generates rough shape data representing a rough three-dimensional shape of an object captured in the obtained multi-viewpoint images. In the present embodiment, as rough shape data, the shape of the object is derived by the visual hull method and three-dimensional shape data represented as a voxel set is generated. In the visual hull method, first, for each captured image configuring the multi-viewpoint images, foreground/background separation is performed by using an image (background image) in the state where no object is captured and an image (silhouette image) representing the silhouette of the object is obtained. The background image is prepared by, for example, capturing the image capturing area 106 in advance in the state where no object exists, or the like. Next, based on the camera parameters of each of the plurality of the cameras 101, each voxel included in the voxel set corresponding to the image capturing area 106 is projected onto each silhouette image of the object, which is obtained from the multi-viewpoint images. Then, in all the silhouette images, the voxel set including only the voxels projected within the silhouette is taken as the rough shape of the object. FIG. 5 is a diagram showing the image capturing area 106 two-dimensionally from above. In FIG. 5, an external rectangle 501 indicated by a one-dot chain line indicates the wall surface of the studio in which the cameras 101 are installed. Further, an inner rectangle 502 indicated by a two-dot chain line indicates a range (image capturing area) in which an object can exist and triangles 506 to 513 indicated by a solid line represent the position, the orientation, and the viewing angle of each of the eight cameras 101. FIG. 6 shows the way a rough shape 601 is obtained by the visual hull method for an object 600 whose center portion is concave.

At S403, the learning area setting unit 303 sets a rectangular parallelepiped circumscribing the rough shape of the object for each object as the target three-dimensional area (learning area) for which learning is performed based on the rough shape data of each object, which is generated at S402. The shape of this learning area only needs to be a solid body containing the rough shape of the object and, for example, may be a sphere or an oval sphere. Alternatively, it may also be possible to set a three-dimensional area having a rougher shape as the learning area, which includes a set of voxels larger than the voxels that are elements configuring the rough shape data.

At S404, the three-dimensional field updating unit 304 secures a memory area corresponding to the learning area set for each object at S403 within the RAM 202 as the three-dimensional field storage unit 305. Here, each following step is explained on the assumption that the "three-dimensional field" is the emitted radiance field (vector field associating the volume density (~ occupancy) and the emitted radiance (~ color) with each other for each coordinate on space) in NeRF. In a case where the three-dimensional field is the emitted radiance field of NeRF, the value representing the volume density (in the following, simply described as "density") at an arbitrary position within space and the value representing the anisotropic color different for each direction are stored in the secured memory area.

At S405, the rendering unit 306 draws an image (performs volume rendering for an image) corresponding to each image capturing viewpoint having the same viewing angle as that of each captured image based on the camera parameters corresponding to each captured image configuring the multi-viewpoint images and the emitted radiance field stored in the three-dimensional field storage unit 305. Specifically, the rendering unit 306 performs processing to find a pixel value C (r) of each pixel, which corresponds to a ray r in a case of being viewed from the same viewpoint as that of the captured image, by using, for example, formula (1) below.

$$C(r) = \sum_{i=1}^{N} T_i(1 - \exp(-\sigma_i\delta_i))c_i \qquad \text{formula (1)}$$

$$T_i = \exp\left(-\sum_{j=1}^{i-1}\sigma_j\delta_j\right)$$

In formula (1) described above, "i" indicates the index of the sampling point, "$\sigma_i$" indicates the density, "$c_i$" indicates the color, and "$\delta_i$" indicates the distance to the next sampling point. Here, the index i of the sampling point is allocated to the plurality of the cameras 101 (eight cameras in the present embodiment) in order from the closest camera (camera closest to front). By formula (1) described above, the pixel values (RGB values) are determined by the weighted sum so that the weight is heavier for the sampling point whose density is higher and which is closer to the camera. In the three-dimensional field storage unit 305 immediately after the processing is started, there is no learned three-dimensional field (here, emitted radiance field of NeRF). Consequently, a pitch-black image in which nothing is captured is obtained as the rendering results. In this manner, the rendered image corresponding to each captured image is obtained. The obtained rendered image is output to the three-dimensional field updating unit 304.

At S406, the three-dimensional field updating unit 304 performs processing to update the emitted radiance field so that the color difference between the captured image and the rendered image in a correspondence relationship with each other becomes small by finding the color difference by taking the learning area of interest among the learning areas set at S403 as a target. This process corresponds to the error calculation and the error backpropagation in deep learning. In the present embodiment, the color difference between both images is calculated for each pixel in a correspondence relationship and the value is defined by the squared Euclidean distance of the colors (RBG).

At S407, whether the updating processing of the emitted radiance field is completed by taking all the learning areas set at S403 as a target is determined. In a case where there is a learning area for which the updating processing of the emitted radiance field has not been completed yet, the processing returns to S405, and the next learning area of interest is determined and the same processing is performed. On the other hand, in a case where the updating processing of the emitted radiance field is completed by taking all the learning areas as a target, the processing moves to S408.

At S408, whether the updating has converged sufficiently for all the emitted radiance fields is determined. In order to determine whether the updating has converged, for example, the total of the errors found for each pixel at all the viewpoints is found and in a case where the reduction width from the total value found previous time becomes lower than a threshold value (for example, 0.1%), it is determined that convergence has converged. Further, it may also be possible to determine convergence in a case where the error found for each pixel becomes smaller than a predetermined threshold value, or it may also be possible to determine convergence at the time in point at which the counted number of times of the updating processing of the emitted radiance field reaches a predetermined number of times. Further, for example, it may also be possible to determine convergence by taking part of the plurality of cameras as a camera for evaluation not used for the updating of the emitted radiance field and in a case where the error from the captured image of the camera for evaluation begins to increase (overlearning occurs). Furthermore, it may also be possible to determine convergence by combining the above. In a case where the updating has converged, this processing is terminated and in a case where the updating has not converged yet, the processing returns to S405 and the same processing is repeated.

Figure 3B:
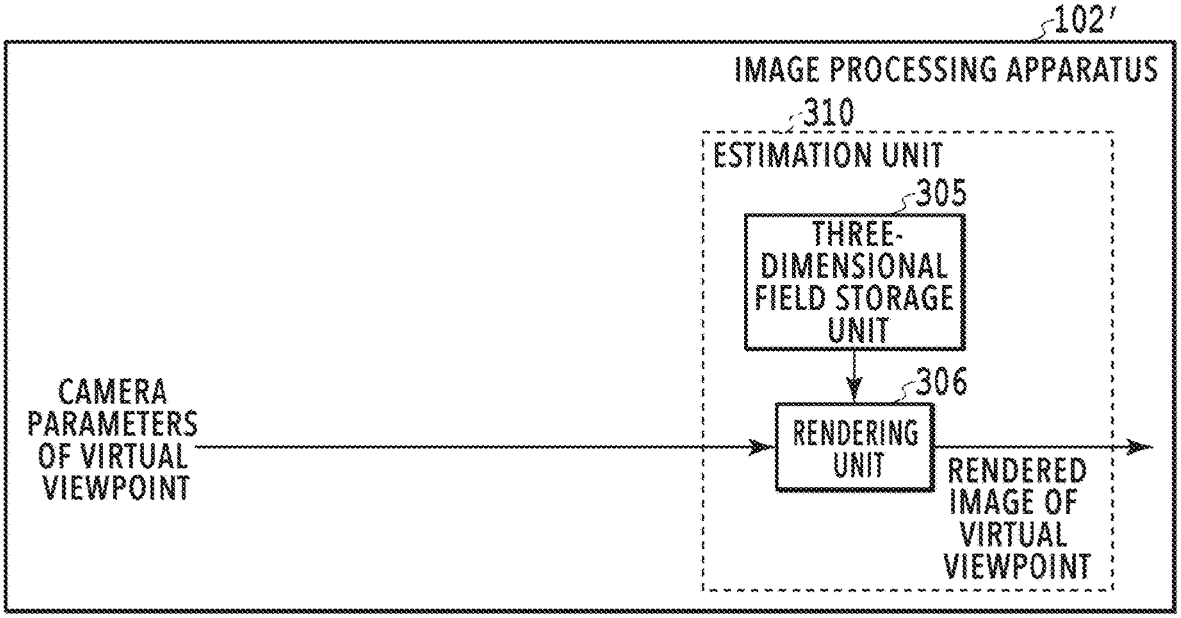

The above is the flow of the operation in the image processing apparatus 102 according to the present embodiment. FIG. 3B is a block diagram showing the function configuration of an image processing apparatus 102' in a case where a virtual viewpoint image is generated (estimation phase) by using the emitted radiance field whose updating is determined to have converged. As shown in FIG. 3B, the image processing apparatus 102' in charge of the estimation phase has an estimation unit 310 including the three-dimensional field storage unit 305 and the rendering unit 306 described previously. To the rendering unit 306 of the estimation unit 310, the camera parameters of a virtual viewpoint are input instead of the camera parameters of an image capturing viewpoint of the imaging device 101. Then, in the rendering unit 306, the rendered image (virtual viewpoint image) corresponding to the virtual viewpoint is generated by performing volume rendering in accordance with the parameters of the virtual viewpoint by using the emitted radiance field whose updating has converged, which is stored in the three-dimensional field storage unit 305. In the flow in FIG. 4 described above, both pieces of processing at S405 and S406 are repeated for each learning area, but this is not limited. For example, it may also be possible to update the emitted radiance field corresponding to each learning area by performing the processing at S406 en bloc after obtaining the rendered image by performing the processing at S405 for all the learning areas. Further, in a case of a moving image, it may also be possible to omit the generation of a rough shape by the visual hull method for part of frames by performing object tracking between frames and performing the setting (S403) of the learning area based on the results. Due to this, it is possible to perform the series of processing in a case of a moving image more efficiently.

<Difference from Prior Art>

Figure 7:
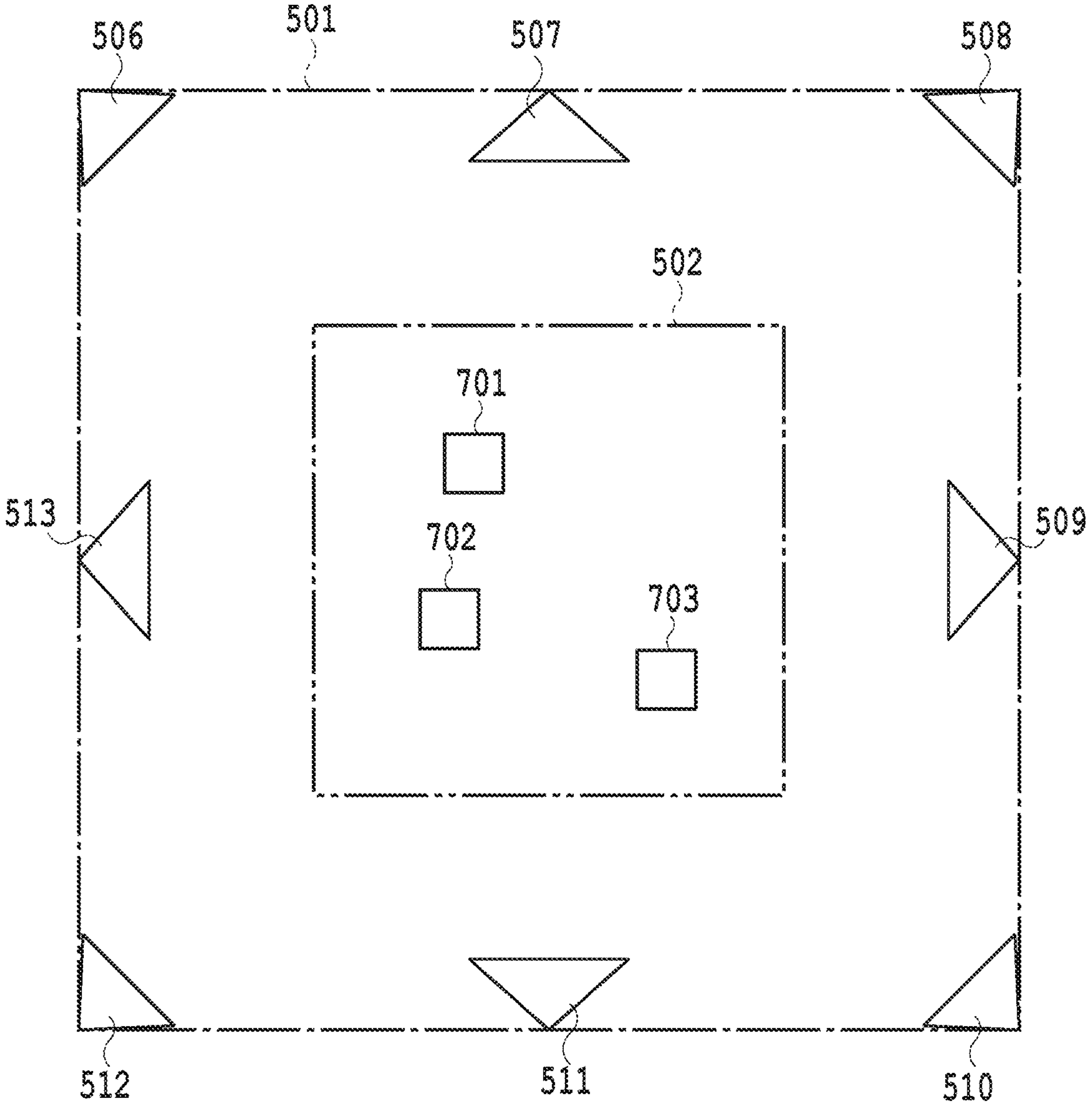
FIG. 7 is a diagram showing a state where three objects exist in an image capturing area.

Here, the difference in the method between the present embodiment and both NeRF and VaxNeRF is explained by taking a case (see FIG. 7) as an example where three objects exist in the image capturing area 502.

<<In a Case of NeRF>>

Figure 8A:
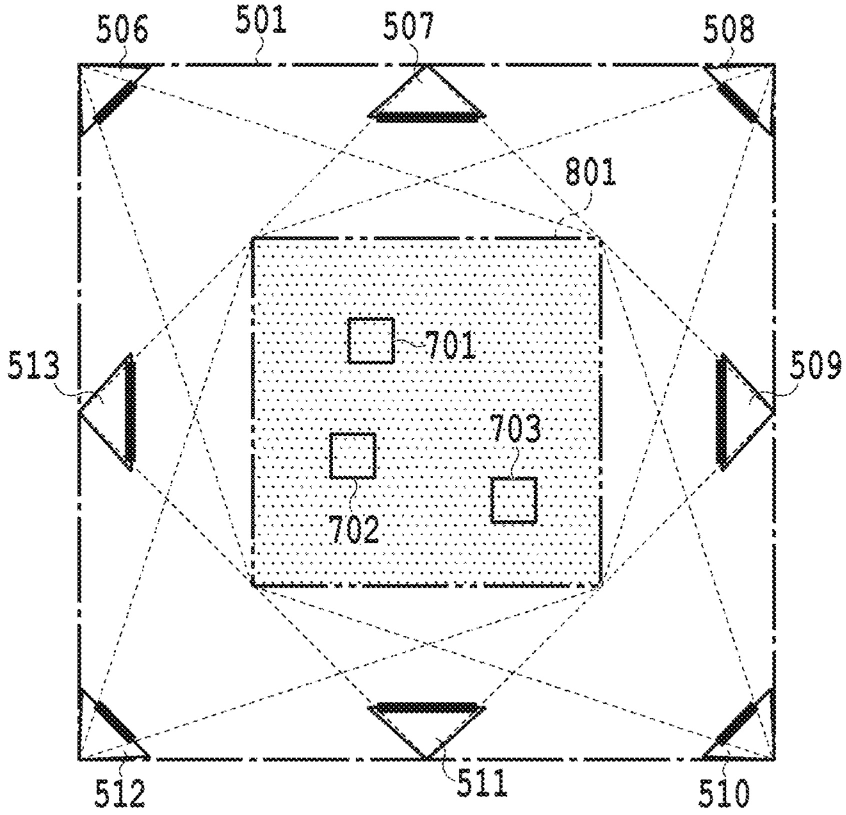
FIG. 8A and FIG. 8B are each a diagram explaining learning by NeRF.
Figure 8B:
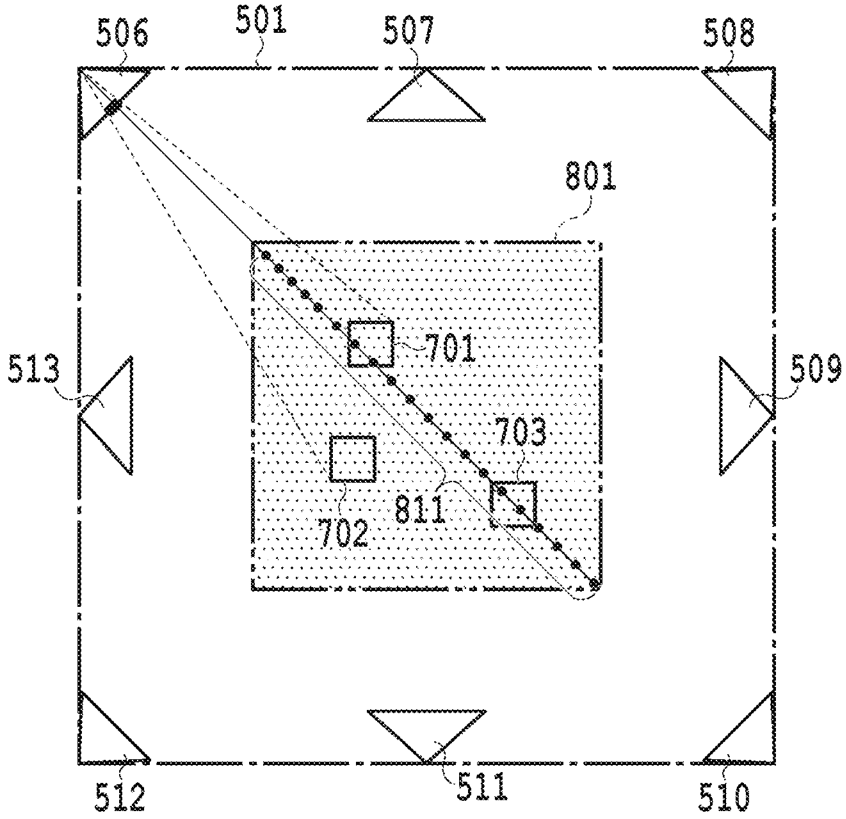

FIG. 8A and FIG. 8B are each a diagram explaining learning in a case where NeRF is applied. In a case of NeRF in which the updating range (learning area) of the emitted radiance field is defined at the time of learning, the whole image capturing area 502 is set as the updating range of the emitted radiance field. In FIG. 8A, a small-dot area 801 represents the learning area set as the updating range of the emitted radiance field and here, the learning area is equal to the image capturing area 502. Then, learning is performed by taking the pixel value of the pixel corresponding to the image capturing area 502 as training data. In FIG. 8A, the thick-line portion of the triangle representing each of the eight cameras 506 to 513 represents the image surface corresponding to the set learning area 801 (=image capturing area 502). In FIG. 8B, a large dot 811 within the small-dot area 801 represents a sampling point on a ray corresponding to a certain pixel on the captured image of the camera 506. In NeRF, rendering is performed by providing sampling points in the whole updating range of the emitted radiance field on the ray, and therefore, learning is performed by taking many pixels as a target, and a s result of that, time is required for processing. In NeRF also, some good ways and means for processing at a higher speed are figured out by reducing the number of sampling points for the portion where the volume density of the object is low continuously.

<<In a Case of VaxNeRF>>

Figure 9A:
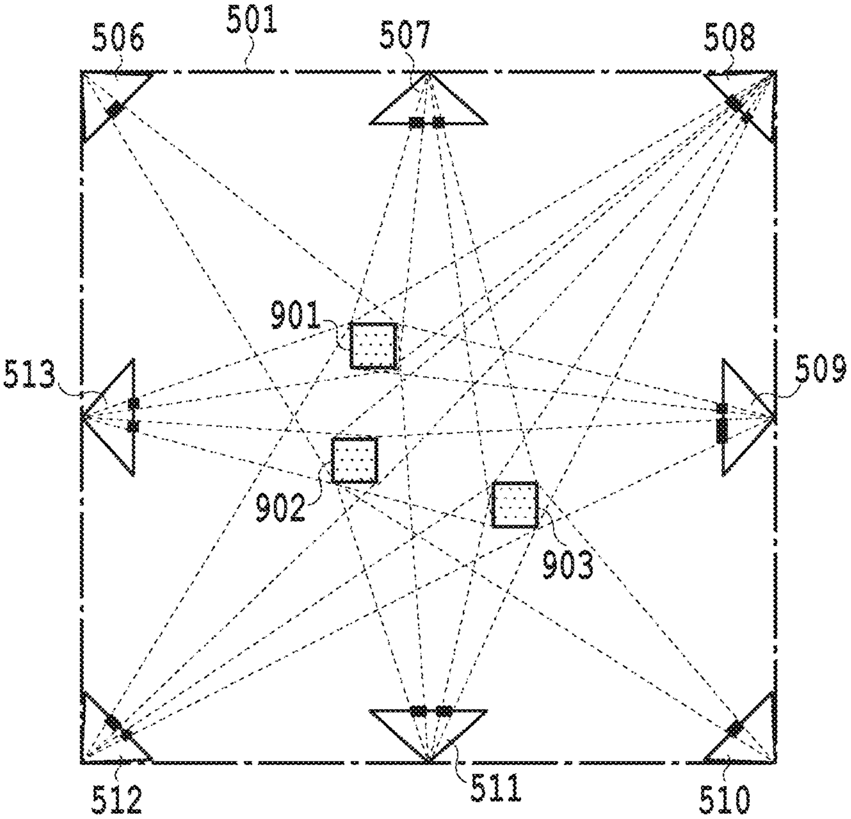
FIG. 9A and FIG. 9B are each a diagram explaining learning by VaxNeRF.
Figure 9B:
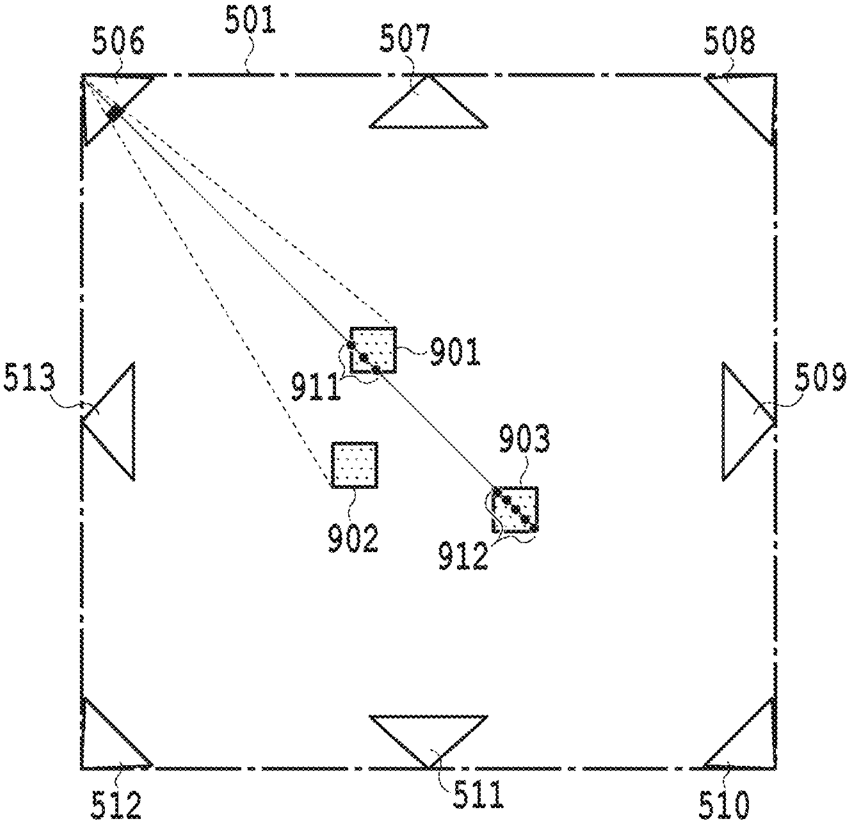

FIG. 9A and FIG. 9B are each a diagram explaining learning in a case where VaxNeRF is applied. In FIG. 9A, three small-dot areas 901 to 903 each represent a learning area set as the updating range of the emitted radiance field. As shown in FIG. 9A, in a case of VaxNeRF, the learning area of the emitted radiance field is set by limiting the range to that where the object exists in the image capturing area 502. Further, in FIG. 9B, large dots 911 and 912 within the three small-dot areas 901 to 903 each represent the sampling point on the ray corresponding to a certain pixel on the captured image of the camera 506. As shown in FIG. 9B, the sampling points are limited to the inside of the rough shape of the object, and therefore, the amount of calculation at the time of rendering is reduced accordingly.

<<In a Case of the Present Method>>

Figure 10A:
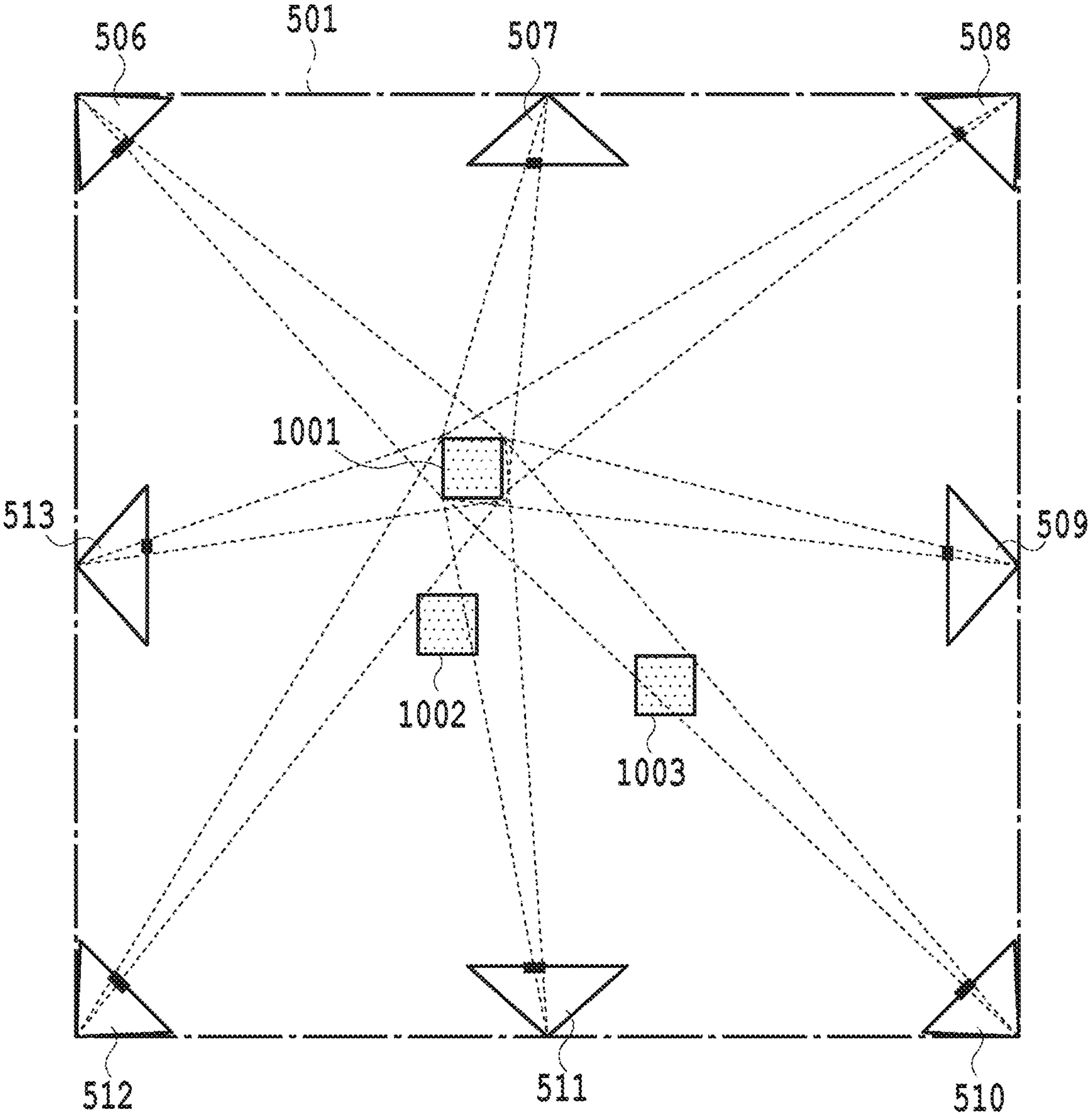
FIG. 10A is a diagram explaining learning by a method of the first embodiment.
Figure 10B:
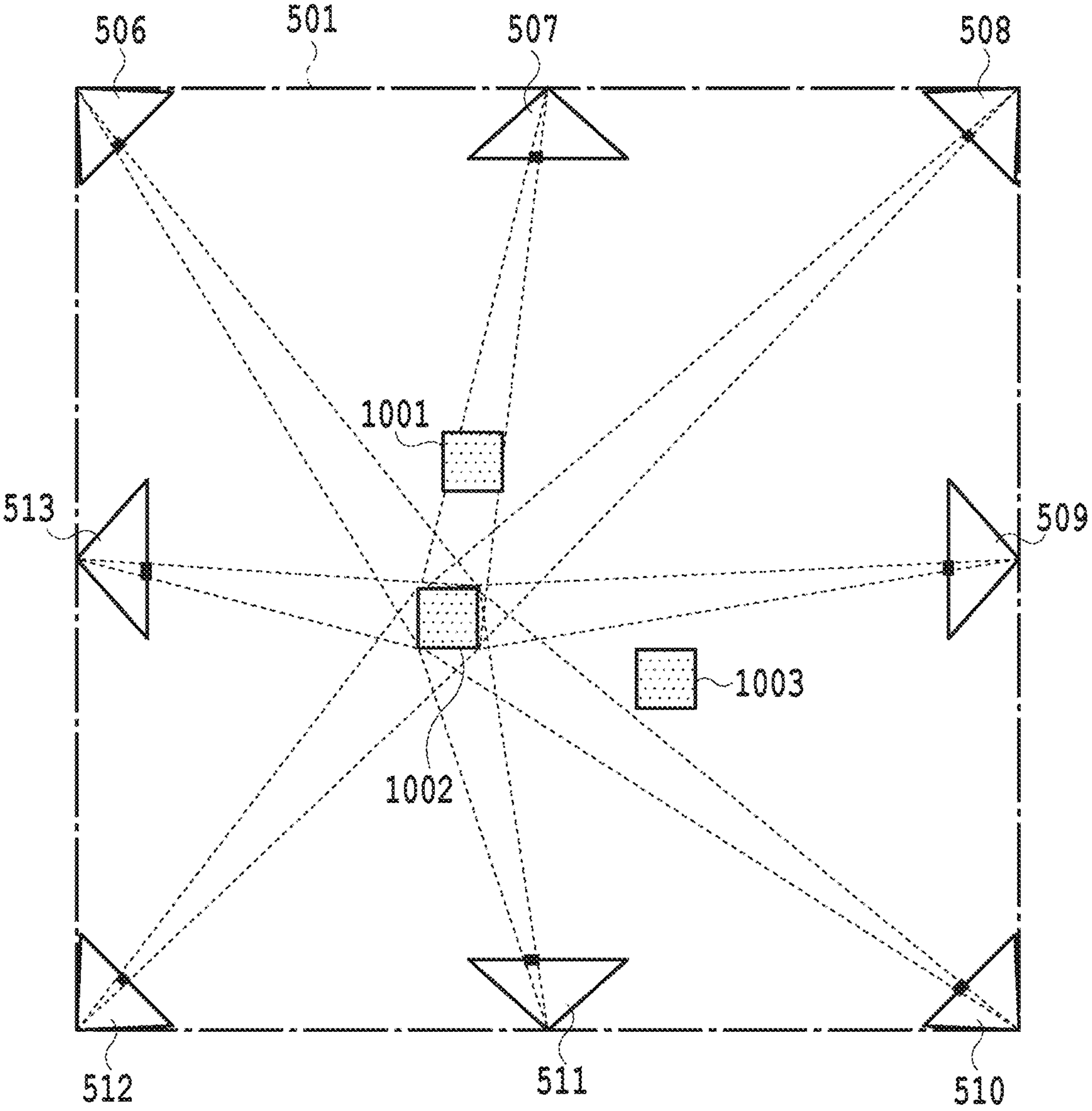
FIG. 10B is a diagram explaining learning by the method of the first embodiment.
Figure 10C:
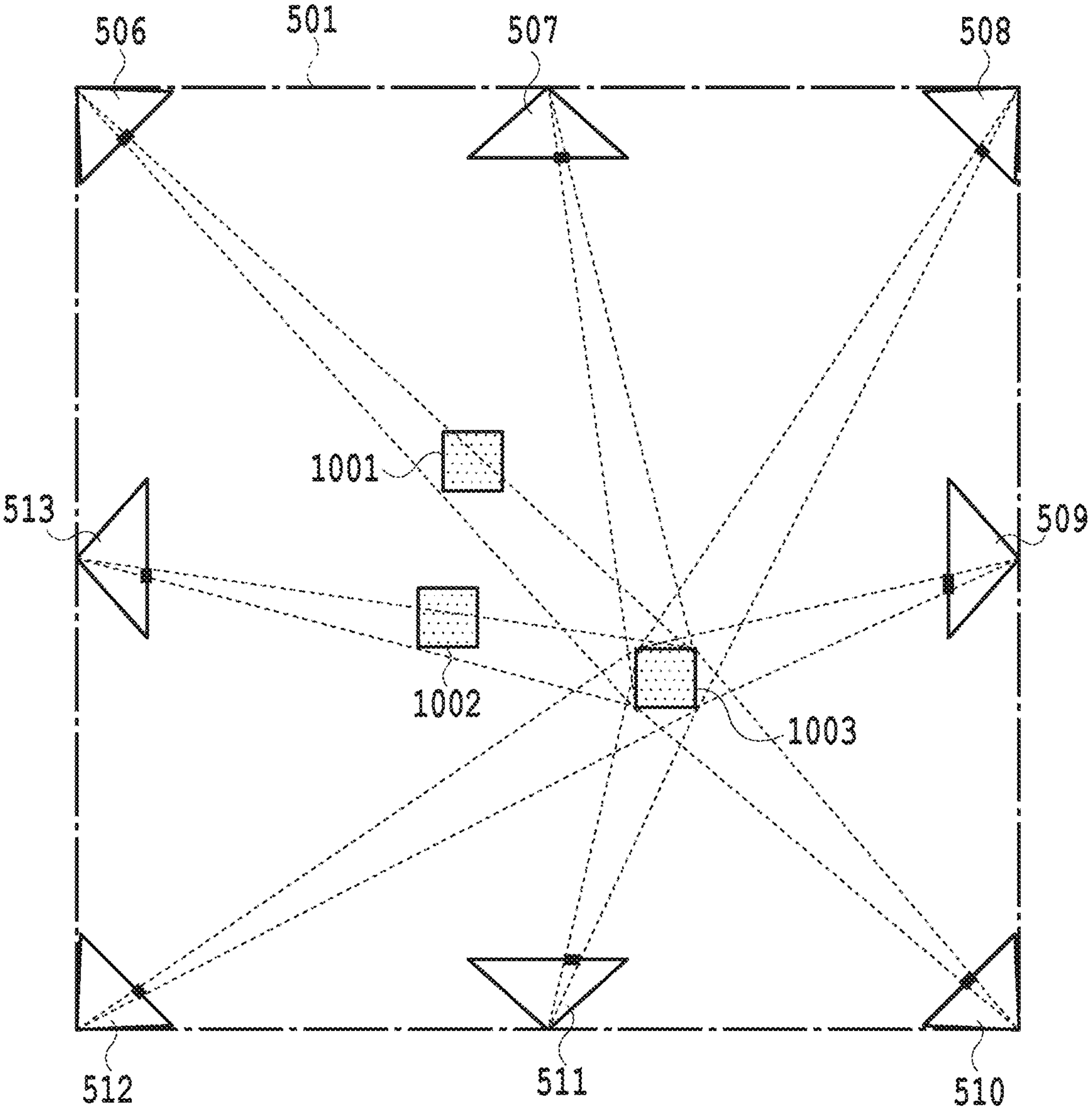
FIG. 10C is a diagram explaining learning by the method of the first embodiment.
Figure 10D:
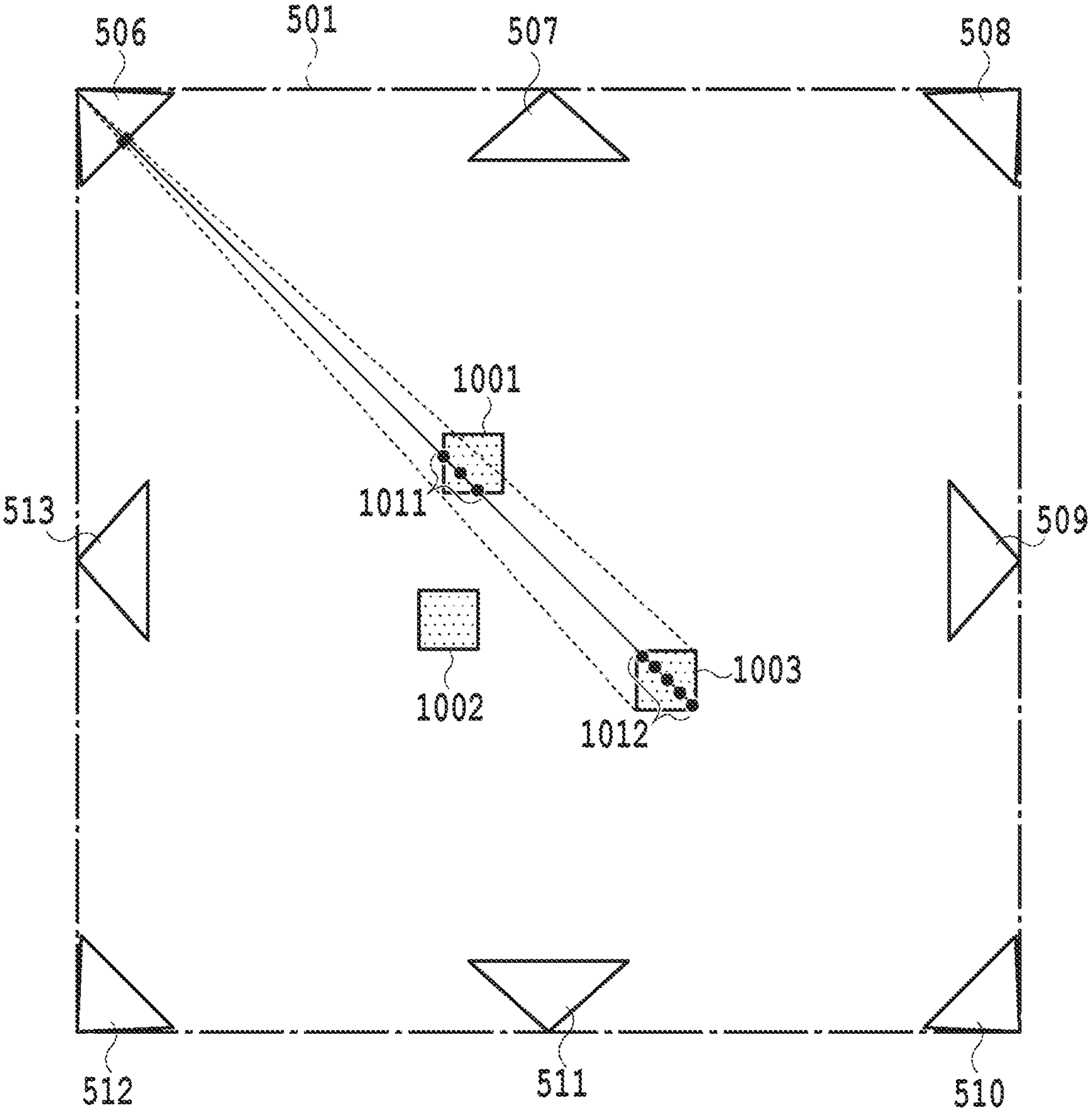
FIG. 10D is a diagram explaining learning by the method of the first embodiment.

FIG. 10A to FIG. 10D are each a diagram for explaining learning in a case where the method of the present embodiment is applied. Here, in the image capturing area 502, three objects exist. Consequently, three rough shapes corresponding to the three objects are obtained and as shown in each of FIG. 10A to FIG. 10C, learning areas 1001 to 1003, which are each the updating range of the emitted radiance field, are set for each object. Different from NeRF and VaxNeRF described above, the emitted radiance field is defined independently for each object, and therefore, the pixel that is utilized for learning with respect to each emitted radiance field is determined. Here, updating is performed separately for each of the emitted radiance fields (in this example, three) for each object, and therefore, there is a case where learning for the same pixel is duplicated as the case may be and the efficiency of learning is reduced accordingly. However, the convergence of learning is expedited for each emitted radiance field by independently defining the emitted radiance field for each object, and the improvement of efficiency can be expected that not only compensates for the reduction in efficiency due to the duplicated learning for part of pixels but also brings about more advantages, and therefore, learning at a higher speed is enabled as a whole. In FIG. 10D, large dots 1011 and 1012 each represent the sampling point on the ray corresponding to a certain pixel on the captured image of the camera 506. As shown in FIG. 10D, at the time of rendering, calculation of color is performed also for the emitted radiance field other than the learning-target emitted radiance field. In a case where the silhouette represented by the silhouette image is correct, it is not necessary to perform sampling for the outside of the rough shape. However, in an actual use, there are quite a few cases where errors are included in the rough shape obtained by the shape estimation of the object, such as the occurrence of missing in part of the silhouette represented by the silhouette image. Consequently, it is preferable to make it possible to absorb the error such as this by performing sampling for the whole inside of the learning area containing the rough shape. However, it may also be possible to perform sampling by taking only the inside of the rough shape as a target as in VaxNeRF.

As above, according to the present embodiment, the learning area is set for each object based on the rough shape of the object and the emitted radiance field defined independently for each object is updated. Due to this, it is possible to reduce the amount of information each emitted radiance field has, and therefore, convergence is expedited and it is possible to perform learning at a higher speed.

Second Embodiment

Next, a method is explained as a second embodiment, which performs learning at a higher speed by using Plenoxels (Alex Yu, Sara Fridovich-Keil, Matthew Tanick, Qinhong Chen, Benjamin Recht, Angjoo Kanazawa. Plenoxels: Radiance Fields without Neural Networks. 9 Dec. 2021) as the representation format of the emitted radiance field defined independently for each object. Plenoxels is a method of representing the emitted radiance field by direct parameters and optimizing the parameters without using the neural network. Consequently, it is made possible to more directly control the volume density and the color value for an arbitrary position within space. In the following, points different from those of the first embodiment are explained mainly.

<Outline of Plenoxels>

Figure 11A:
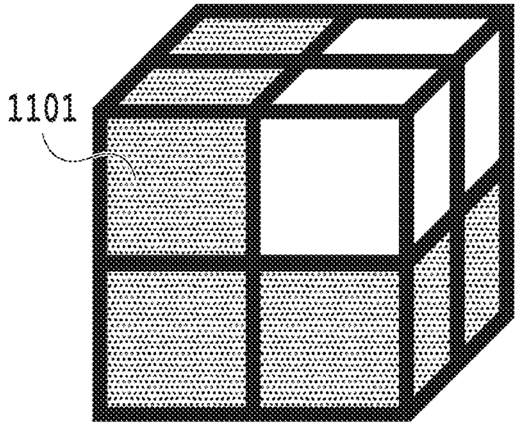
FIG. 11A to FIG. 11C are diagrams explaining an outline of Plenoxels.
Figure 11C:
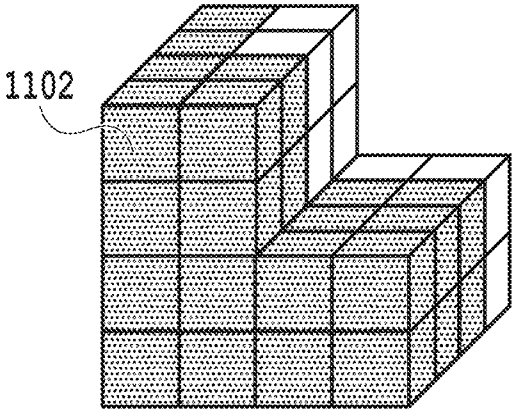
Figure 11B:
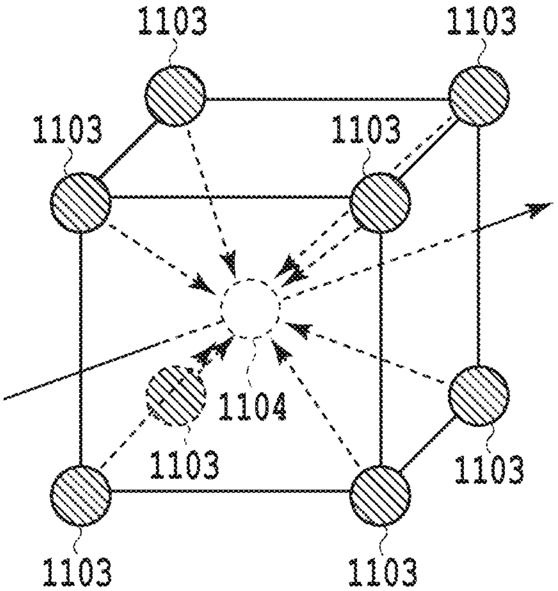

Before explaining the present embodiment, the outline of Plenoxels is explained. In Plenoxels, first, space is divided into rough voxel grids. FIG. 11A shows one voxel 1101 in a roughly divided voxel grid. Then, as shown in FIG. 11B, at the position of corners (eight vertices) 1103 of each voxel, a volume density σ and a color c for each direction are stored as parameters of a spherical harmonic function. Here, in a case where the value of an arbitrary point 1104 other than the vertex 1103 corresponding to the corner of the voxel is obtained, the values of the eight vertexes of the voxel including the arbitrary point 1104 are obtained and by performing trilinear interpolation, the volume density σ and the color c of the arbitrary point 1104 are found. Then, by using the parameters thus obtained, rendering is performed by calculating the pixel value of the sampling point on the ray corresponding to a certain pixel as in the case of NeRF, and the emitted radiance field is updated so that the difference between the obtained rendered image and the captured image becomes small. The objective function for this updating is defined as formula (2) below.

$$L = L_{recon} + \lambda_{TV} L_{TV} \qquad \text{formula (2)}$$

$$L_{recon} = \frac{1}{|R|}\sum_{r\in R}\|C(r) - \hat{C}(r)\|_2^2$$

$$L_{TV} = \frac{1}{|V|}\sum_{v\in V}\sqrt{\Delta_x^2(v, d) + \Delta_y^2(v, d) + \Delta_z^2(v, d)}$$

In formula (2) described above, "$L_{recon}$" is the term that reduces the difference from the pixel value of the captured image and "$L_{TV}$" is the term that reduces the difference in the value between parameters in the vicinity. For the optimization of parameters by the objective function, for example, the RMSProp method, the steepest descent method, the Adam method, the SGD method or the like is used.

Then, the emitted radiance field by the rough voxel grid shown in FIG. 11A is optimized and the range to be learned is identified by the volume density. Next, by taking the identified range as a target, the emitted radiance field by the finer voxel grid obtained by deleting unnecessary portions as shown in FIG. 11C is optimized. The above is the outline of Plenoxels.

<Method of the Present Embodiment>

In the present embodiment, the process of the above-described optimization in Plenoxels is simplified by using the visual hull method. Here, the estimation of "rough emitted radiance field" in Plenoxels has the same role of obtaining the rough shape explained in the first embodiment. That is, it is possible to define the object shape by finer voxels in accordance with the rough shape obtained by the rough shape generation unit 302. Further, by finding in advance the initial values of the parameters to be allocated to each fine voxel, the optimization is caused to converge at a higher speed. Further, in the present embodiment, a method is also explained, which further reduces the number of pixels to be utilized for learning by utilizing the visibility determination (shielding determination) of an object. It is also possible to apply the way of thinking of further reducing the number of pixels to be utilized for learning by utilizing the visibility determination to the first embodiment.

<Operation of Image Processing Apparatus>

Figure 12:
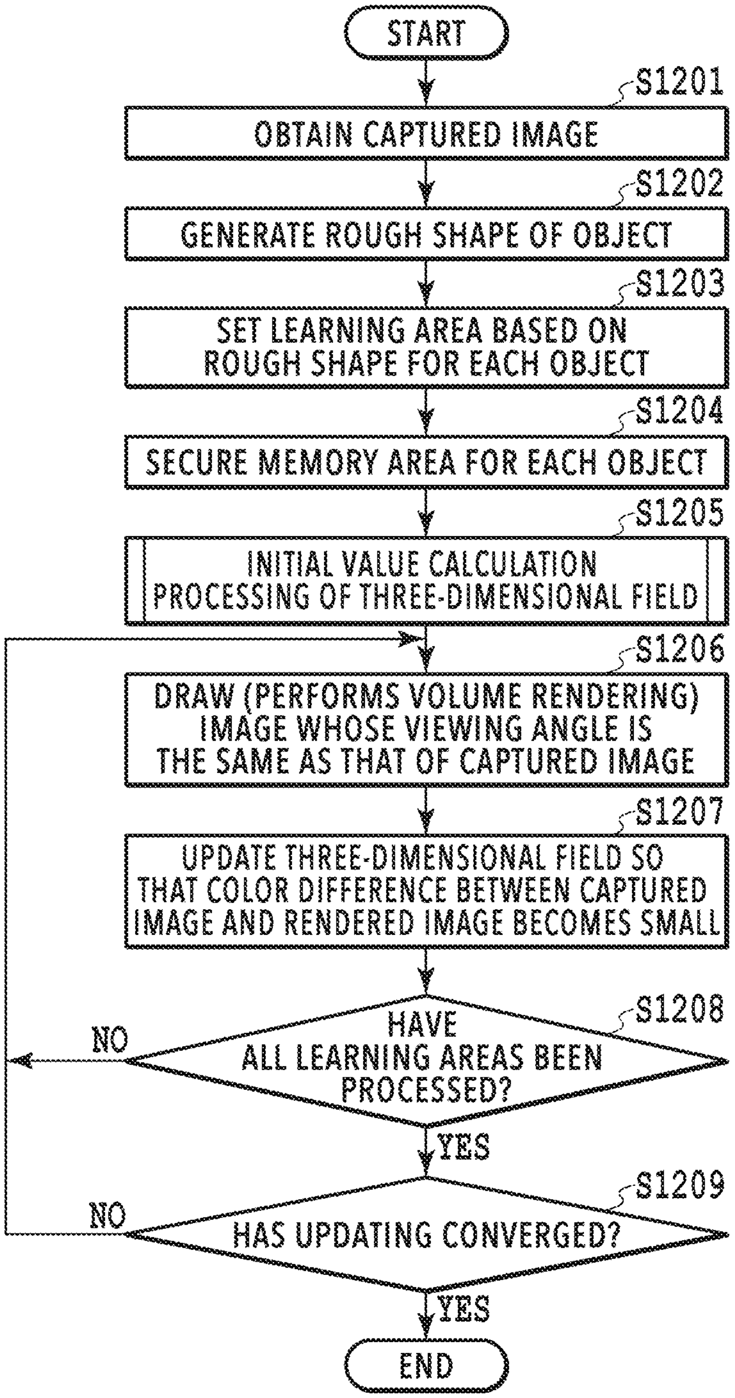
FIG. 12 is a flowchart showing a flow of the operation of an image processing apparatus according to a second embodiment.

Following the above, the operation of the image processing apparatus 102 according to the present embodiment is explained. FIG. 12 is a flowchart showing a flow of the operation of the image processing apparatus 102 according to the present embodiment. It is also possible to implement the method of the present embodiment by the image processing apparatus 102 having each function unit shown in FIG. 3. However, as regards part of the function of the learning area setting unit 303, there is a different portion. In the following, the different portion is explained mainly.

S1201 and S1202 are the same as S401 and S402 in the flow in FIG. 4 of the first embodiment, and therefore, explanation is omitted.

At S1203, based on the rough shape obtained at S1202, the learning area setting unit 303 sets a three-dimensional area including rough voxels as the learning area in which updating of the emitted radiance field is performed.

At S1204, the three-dimensional field updating unit 304 secures a memory area corresponding to the learning area set for each object at S1203. Specifically, within the RAM 202 as the three-dimensional field storage unit 305, a memory area is secured for storing parameters representing the emitted radiance filed for the fine voxels obtained by dividing the rough voxels.

At S1205, the three-dimensional field updating unit 304 performs processing to calculate the initial value of the emitted radiance field defined for each object. Details of this initial value calculation processing will be described later.

At S1206, the rendering unit 306 performs the same processing as that at S405 in the flow in FIG. 4 of the first embodiment. That is, the rendering unit 306 draws an image whose viewing angle is the same as that of the captured image based on the camera parameters corresponding to each captured image configuring the multi-viewpoint images and the three-dimensional field (here, the emitted radiance field) stored in the three-dimensional field storage unit 305.

At S1207, the rendering unit 306 finds the difference in the pixel value between the captured image and the rendered image in a correspondence relationship with each other by taking the learning area of interest as a target and performs processing to update the emitted radiance field so that the difference in the pixel value becomes small. At this time, at S1206 that is performed first immediately after the processing starts, the initial value generated at S1205 is used. Then, this initial value is set based on only the pixel determined to be visible by the visibility determination, to be described later.

S1208 and S1209 are the same as S407 and S408 in the flow in FIG. 4 of the first embodiment, and therefore, explanation is omitted.

The above is the flow of the operation in the image processing apparatus 102 according to the present embodiment.

<Details of Initial Value Calculation Processing of Emitted Radiance Field>

Figure 13:
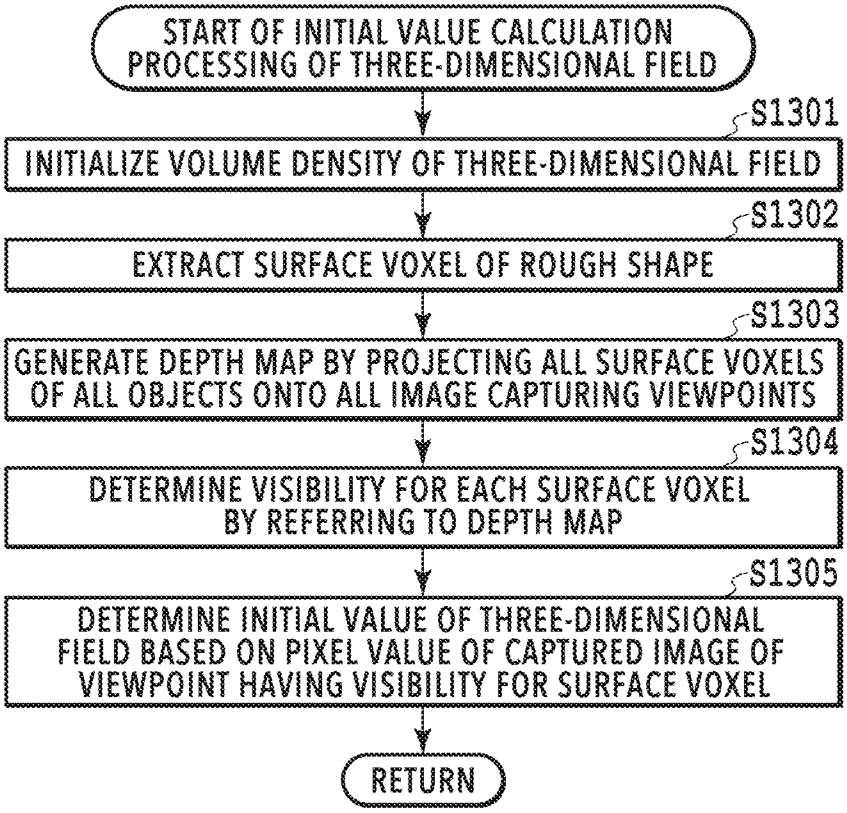
FIG. 13 is a flowchart showing details of initial value calculation processing of an emitted radiance field.
Figure 14A:
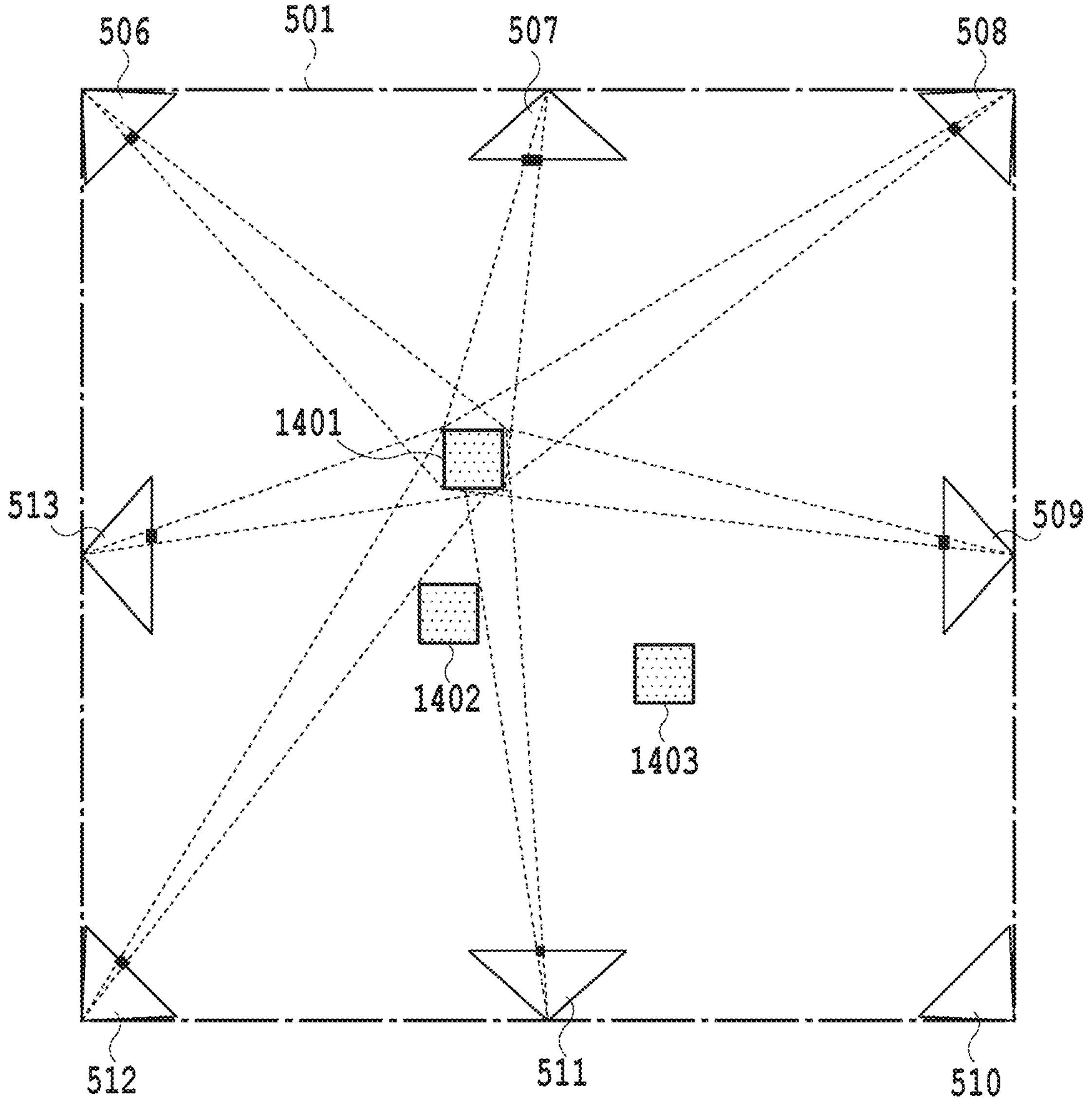
FIG. 14A is a diagram explaining learning by a method of the second embodiment.
Figure 14B:
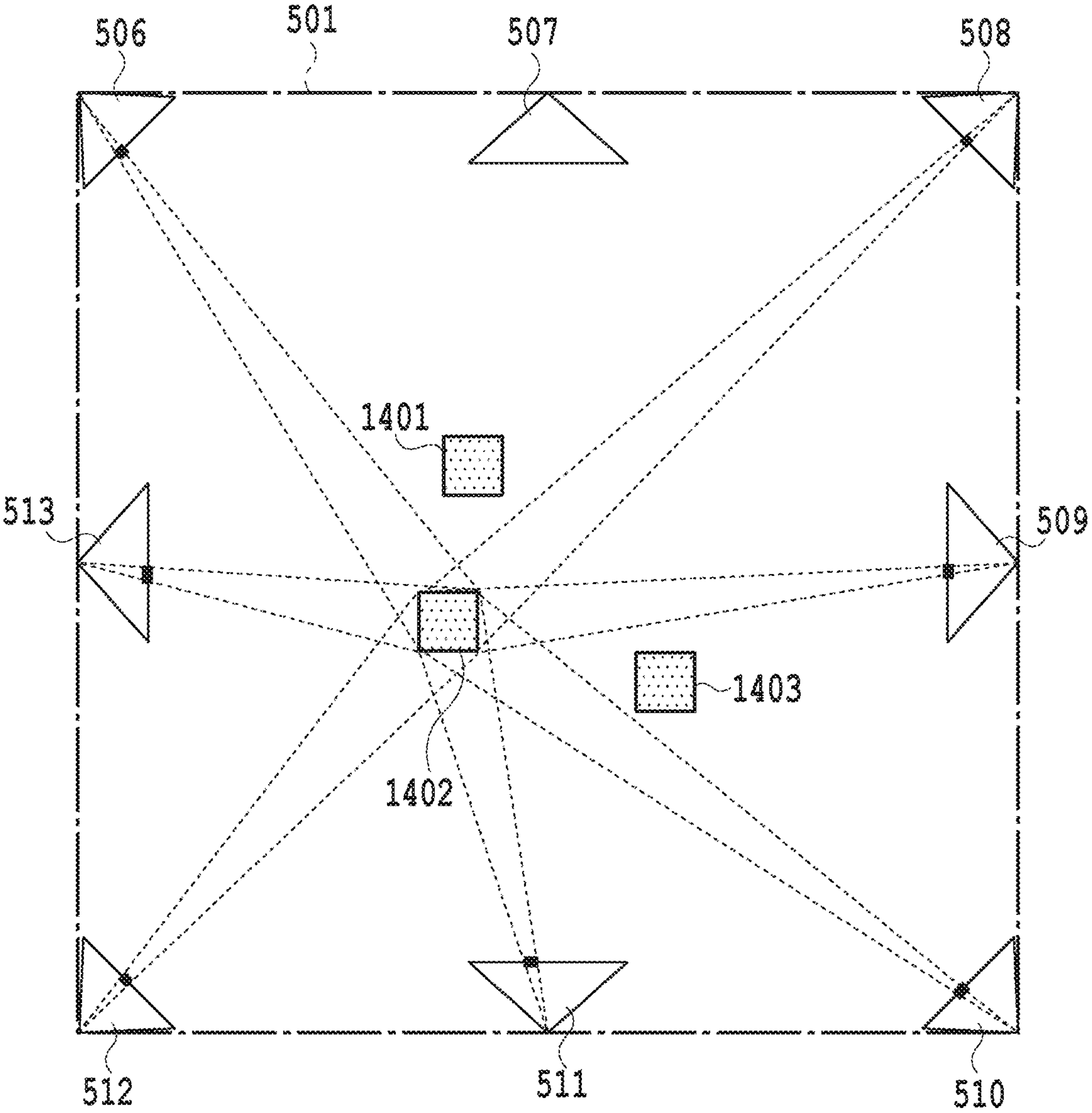
FIG. 14B is a diagram explaining learning by the method of the second embodiment.
Figure 14C:
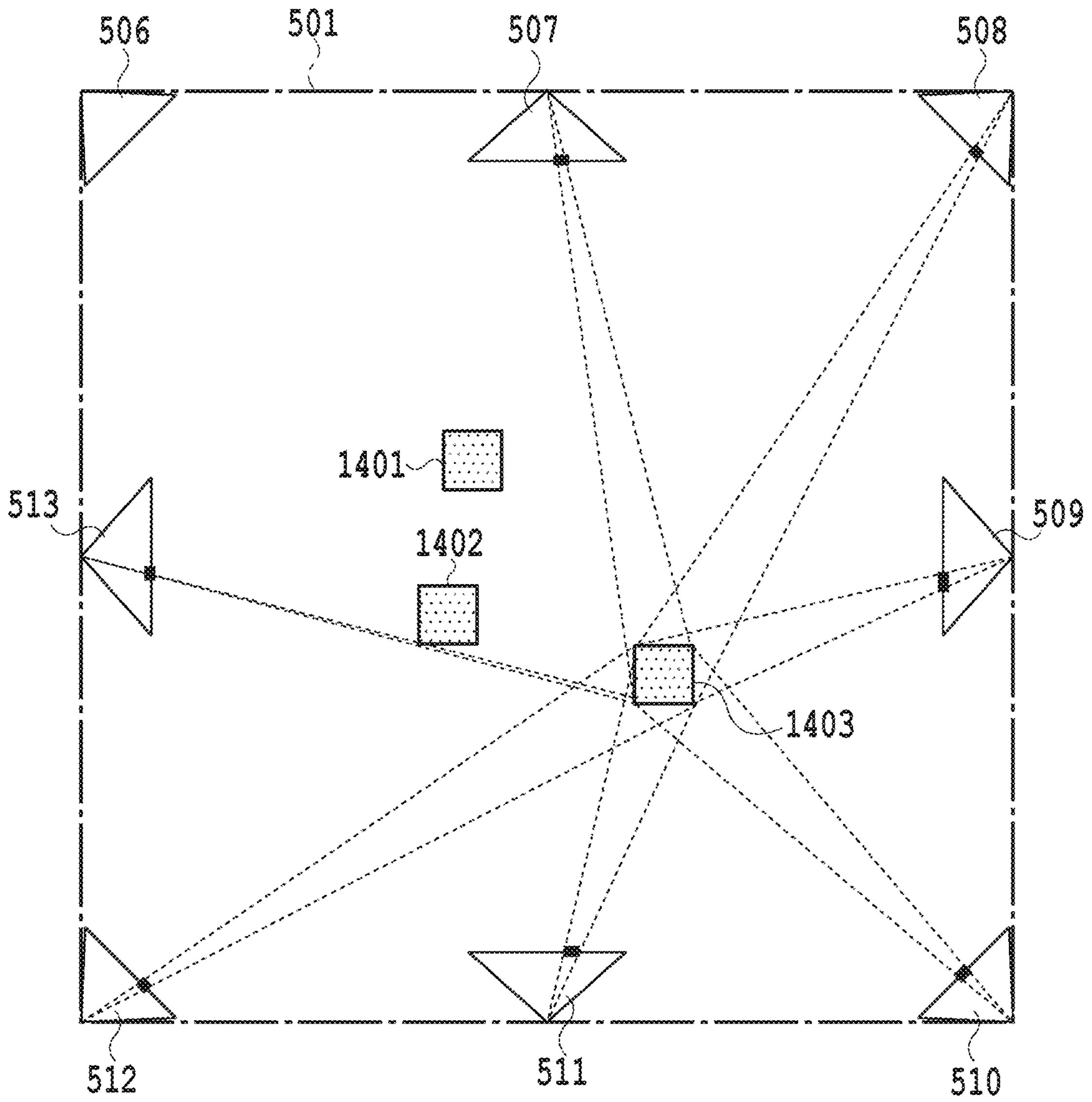
FIG. 14C is a diagram explaining learning by the method of the second embodiment.
Figure 14D:
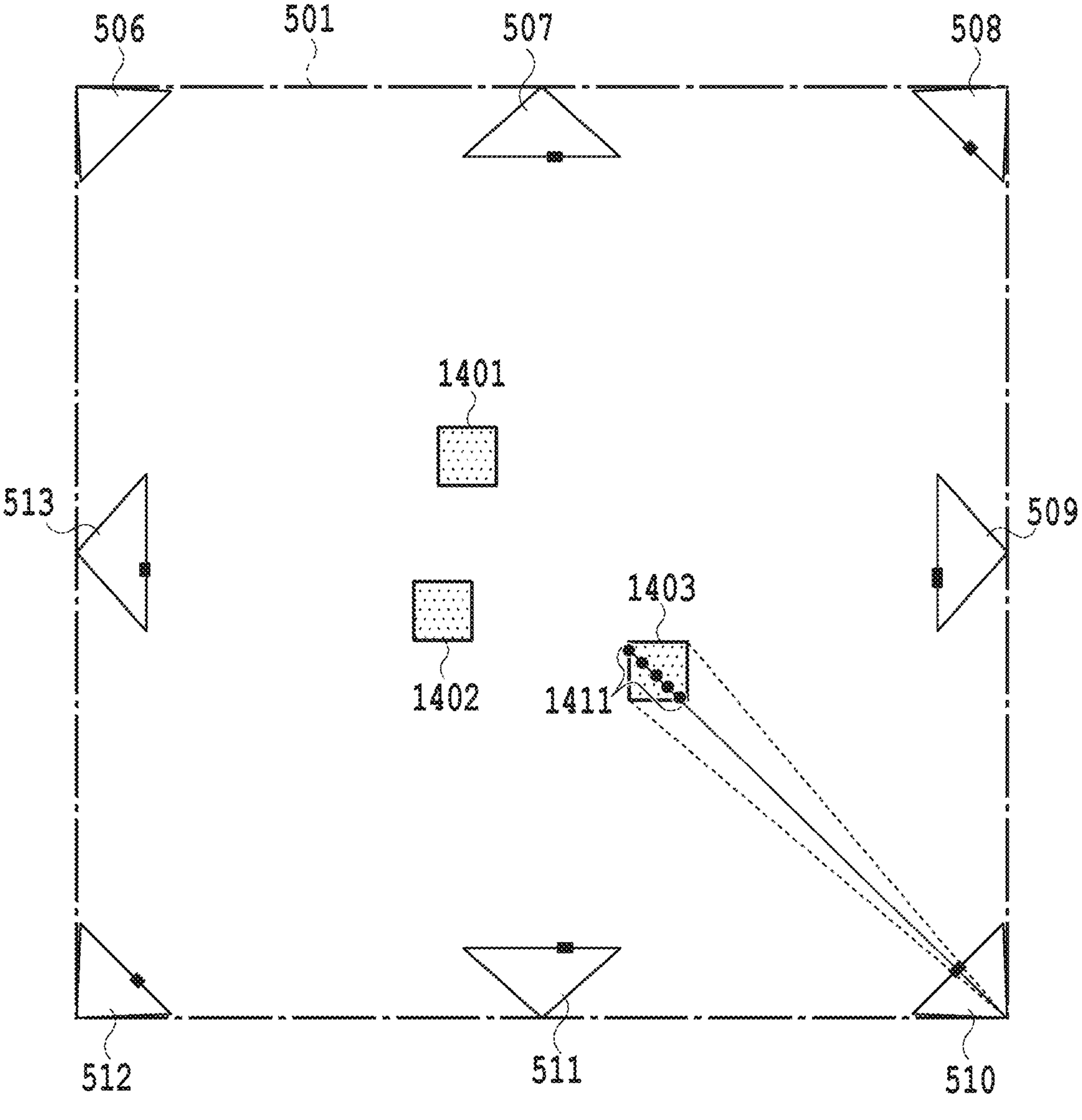
FIG. 14D is a diagram explaining learning by the method of the second embodiment.

Following the above, with reference to the flowchart in FIG. 13, the initial value calculation processing of the emitted radiance field defined for each object is explained in detail. Each piece of processing at S1301 to S1303 is performed en bloc by taking all the objects as a target.

At S1301, the volume density of the emitted radiance field is initialized.

Specifically, processing is performed, which allocates σ=1 to each voxel configuring the fine voxel grid in a case where the voxel is located inside of the rough shape, σ=0 in a case where the voxel is located outside, and σ=0.5 in a case where the voxel is located on the surface.

At S1302, the surface voxel in the rough shape obtained at S1202 is extracted. This extraction of the surface voxel is implemented by, for example, selecting the voxel located inside of the rough shape and adjacent to the voxel located outside the rough shape.

At S1303, the surface voxels of all the objects extracted at S1302 are projected onto the image surface by using the camera parameters of all the image capturing viewpoints of the multi-viewpoint images and a depth map at all the image capturing viewpoints is generated. The generated depth map is stored in the RAM 102.

At S1304, processing is performed for each surface voxel, which determines the visibility from each viewpoint by projecting the center coordinates of the surface voxel onto the image capturing viewpoint and comparing a depth value (d') by the projection with a depth value (d) in the depth map. Specifically, in a case where d'≤d+m, visibility (not being shielded) is determined. Here, "m" is a constant and which is one size larger than that of the voxel in the fine voxel grid, and for example, "m" takes a constant of 1 to 2 mm.

At S1305, color information on the emitted radiance field is initialized for each surface voxel based on the pixel value of the captured image corresponding to the viewpoint determined to have visibility. In Plenoxels, the color different for each direction is represented by the parameters of the spherical harmonic function for each component of RGB. Consequently, processing is performed as the initialization processing, which takes, for example, the base component (average of values in all the directions) of the spherical harmonic function as the average value of the pixel values of the captured images corresponding to the viewpoints determined to have visibility and takes the component representing the change in color for each another direction as 0.

<Comparison with First Embodiment>

FIG. 14A to FIG. 14D are each a diagram explaining learning in a case where the method of the present embodiment is applied and correspond to FIG. 10A to FIG. 10D, respectively, of the first embodiment. As shown in each of FIG. 14A to FIG. 14C, three emitted radiance fields 1401 to 1403 are each optimized by utilizing only the pixel whose corresponding object is visible. Due to this, it is made possible to perform updating without the influence of another emitted radiance field, and therefore, it is possible to further reduce the amount of information each emitted radiance field has as well as enabling optimization by processing a plurality of emitted radiance fields in parallel. Further, there is no longer duplication of the pixel to be utilized for optimization between objects, and therefore, the amount of calculation is further reduced.

As above, according to the present embodiment, Plenoxels in which the emitted radiance field is handled by direct parameters is taken as a basis and after the initial value of each emitted radiance field is calculated, the updating of each emitted radiance field is performed, and therefore, it is possible to further expedite the convergence of optimization. Further, by additionally performing the visibility determination, it is possible to further reduce the amount of calculation and it is possible to considerably increase the speed of learning.

<Modification Example>

In the first and second embodiments, explanation is given by taking the emitted radiance field as an example of the three-dimensional field, which associates the volume density and the color different for each direction with each other for each coordinate on space, but this is not limited. For example, color information that is associated with the coordinate within space may be an isotropic color (color field) independent of the direction. Further, the three-dimensional field is not limited to the emitted radiance field. For example, the three-dimensional field may be Occupancy Field representing the volume density. Further, the three-dimensional field may be a field represented by the bidirectional reflectance distribution function (BRDF) representing the distribution characteristics of reflected light for incident light. Furthermore, the three-dimensional field may be a field representing Light Visibility of ambient light. Like the emitted radiance field explained in the first and second embodiments, it is possible for these fields to perform learning with the multi-viewpoint images as an input and by inputting the camera parameters of the virtual viewpoint to each field after learning, the following virtual viewpoint data is obtained.

- Occupancy Field: map representing occupancy in a case of being viewed from a virtual viewpoint
- Field of bidirectional reflectance distribution function: map representing the bidirectional reflectance distribution function in a case of being viewed from a virtual viewpoint
- Field of Light Visibility of ambient light: map representing degree of visibility in a case of being viewed from a virtual viewpoint Further, the three-dimensional field may be a floating point field (Signed Distance Field) in which the inside of an object is negative and the outside is positive or a binary field (Surface Field) in which the inside of an object is 0 and the outside is 1. Furthermore, the three-dimensional field may be a field in the direction of the normal to the object surface (Normal Field). In a case of these fields, learning is performed, which takes the depth map corresponding to the multi-viewpoint images as an input, in addition to the multi-viewpoint images, and based on each field after learning, the following virtual viewpoint data is obtained.

- Floating point field (Signed Distance Field) in which the inside of an object is negative and the outside is positive: depth map in a case of being viewed from a virtual viewpoint
- Binary field (Surface Field) in which the inside of an object is 0 and the outside is 1: depth map in a case of being viewed from a virtual viewpoint Field in the direction of the normal to the object surface: normal map in a case of being viewed from a virtual viewpoint For example, Surface Field described above is utilized in Pixel NeRF or Double Field. Further, BRDF, Light Visibility, and Normal Field are utilized in NeRFactor. Furthermore, Signed Distance Field is utilized in NeuS. It is possible to apply the method of the present invention also to these fields.

The method of generating virtual viewpoint data based on virtual viewpoint parameters is explained up to this point, and the learning of the three-dimensional field is also effective for obtaining three-dimensional shape data. For example, it is possible to obtain mesh data by extracting Occupancy Field or Signed Distance Field as a voxel and using the Marching Cubes method for the extracted voxel.

Other Embodiment

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is made possible to perform learning at a higher speed for generating an image or the like corresponding to a virtual viewpoint from multi-viewpoint images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-078633, filed May 11, 2023 which is hereby incorporated by reference wherein in its entirety.

What is claimed is:

1. An image processing apparatus comprising:

one or more memories storing instructions; and one or more processors executing the instructions to perform:

obtaining a plurality of captured images obtained by a plurality of imaging devices;

obtaining three-dimensional shape data representing a three-dimensional shape of each object of a plurality of objects based the obtained plurality of captured images;

setting a learning area for each object of the plurality of objects based on the obtained three-dimensional shape data corresponding to each object of the plurality of the objects; and learning a three-dimensional field in accordance with the captured image for obtaining virtual viewpoint data corresponding to a virtual viewpoint from the plurality of captured images by taking the learning area set for each object of the plurality of objects as a target, wherein a color difference is found between a captured image and a rendered image in a correspondence relationship with each other by taking a learning area of interest among the learning areas set for each object of the plurality of objects as a target and the three-dimensional field is updated so that the color difference becomes small, and wherein the updating is performed by finding the color difference between both images for each pixel in a correspondence relationship.

2. The image processing apparatus according to claim 1, wherein in the learning:

the three-dimensional field is stored in a storage unit;

an image corresponding to each image capturing viewpoint having the same viewing angle as that of each captured image is rendered based on camera parameters corresponding to each of the plurality of captured images and the three-dimensional field stored in the storage unit; and the three-dimensional field is updated based on a plurality of rendered images obtained by the rendering and the plurality of captured images.

3. The image processing apparatus according to claim 1, wherein the updating is performed by finding the color difference from a pixel of the captured image having visibility for an element configuring the three-dimensional shape data and a pixel of the rendered image corresponding thereto.

4. The image processing apparatus according to claim 3, wherein the updating is performed by determining an initial value of the three-dimensional field based on a pixel value of a captured image of a viewpoint having visibility for the element.

5. The image processing apparatus according to claim 1, wherein a solid body circumscribing the three-dimensional shape of each object of the plurality of objects, which is represented by the three-dimensional shape data, is set as the learning area.

6. The image processing apparatus according to claim 1, wherein the three-dimensional shape data is data identifying the three-dimensional shape of each object of the plurality of objects by a set of a plurality of elements and a three-dimensional area represented by a set of elements whose size is larger than that of the element is set as the learning area.

7. The image processing apparatus according to claim 1, wherein the three-dimensional shape data representing the three-dimensional shape of each object of the plurality of objects is generated by the visual hull method using the plurality of captured images.

8. The image processing apparatus according to claim 1, wherein the three-dimensional field is an emitted radiance field associating a volume density and an anisotropic color with each other for each coordinate in an image capturing space of the plurality of imaging devices and the virtual viewpoint data is a virtual viewpoint image showing an appearance from a virtual viewpoint.

9. The image processing apparatus according to claim 1, wherein the three-dimensional field is an emitted radiance field associating a volume density and an isotropic color with each other for each coordinate in an image capturing space of the plurality of imaging devices and the virtual viewpoint data is a virtual viewpoint image showing an appearance from a virtual viewpoint.

10. The image processing apparatus according to claim 1, wherein the three-dimensional field is Occupancy Field representing a volume density and the virtual viewpoint data is a map representing occupancy in a case of being viewed from a virtual viewpoint.

11. The image processing apparatus according to claim 1, wherein the three-dimensional field is a field of a bidirectional reflectance distribution function and the virtual viewpoint data is a map representing a bidirectional reflectance distribution function in a case of being viewed from a virtual viewpoint.

12. The image processing apparatus according to claim 1, wherein the three-dimensional field is a field of Light Visibility of ambient light and the virtual viewpoint data is a map representing a degree of appearance in a case of being viewed from a virtual viewpoint.

13. The image processing apparatus according to claim 1, wherein the three-dimensional field is a floating point field (Signed Distance Field) in which the inside of an object is represented as negative and the outside is represented as positive or a binary field (Surface Field) in which the inside of an object is represented as 0 and the outside is represented as 1 and the virtual viewpoint data is a depth map in a case of being viewed from a virtual viewpoint.

14. The image processing apparatus according to claim 1, wherein the three-dimensional field is a field in a direction of a normal to the object surface (Normal Field) and the virtual viewpoint data is a normal map in a case of being viewed from a virtual viewpoint.

15. The image processing apparatus according to claim 1, wherein the one or more processors further execute the instructions to perform:

outputting the virtual viewpoint data by performing estimation by using a three-dimensional field learned by the image processing apparatus according to claim 1.

16. The image processing apparatus according to claim 15, wherein in the estimating:

a learned three-dimensional field is stored in a storage unit and the virtual viewpoint data is generated based on the three-dimensional field stored in the storage unit in accordance with camera parameters of a virtual viewpoint.

17. The image processing apparatus according to claim 1, wherein, in the learning, the one or more processors perform an update process of the three-dimensional field by taking, as a learning target, the learning area corresponding to a first object among the plurality of objects, and subsequently perform the update process of the three-dimensional field by taking, as the learning target, the learning area corresponding to a second object among the plurality of objects.

18. The image processing apparatus according to claim 1, wherein, in the learning, the one or more processors generate, by the rendering, rendered images for the respective learning areas corresponding to the plurality of objects, and thereafter collectively update the three-dimensional fields corresponding to the respective learning areas.

19. The image processing apparatus according to claim 1, wherein, in a case where the plurality of captured images includes frame images of a moving image, the one or more processors set the learning area based on an object tracking result between frames, and, for at least some frames, omit generating the three-dimensional shape data.

20. An image processing method comprising the steps of:

obtaining a plurality of captured images obtained by a plurality of imaging devices;

obtaining three-dimensional shape data representing a three-dimensional rough shape of each object of a plurality of objects based the obtained plurality of captured images;

setting a learning area for each object of the plurality of objects based on the obtained three-dimensional shape data corresponding to each object of the plurality of the objects; and learning a three-dimensional field in accordance with the captured image for obtaining virtual viewpoint data corresponding to a virtual viewpoint from the plurality of captured images by taking the learning area set for each object of the plurality of objects as a target, wherein a color difference is found between a captured image and a rendered image in a correspondence relationship with each other by taking a learning area of interest among the learning areas set for each object of the plurality of objects as a target and the three-dimensional field is updated so that the color difference becomes small, and wherein the updating is performed by finding the color difference between both images for each pixel in a correspondence relationship.

21. A non-transitory computer readable storage medium storing a program for causing a computer to perform an image processing method comprising the steps of:

obtaining a plurality of captured images captured by a plurality of imaging devices;

obtaining three-dimensional shape data representing a three-dimensional rough shape of each object of a plurality of objects based the obtained plurality of captured images;

setting a learning area for each object of the plurality of objects based on the obtained three-dimensional shape data corresponding to each object of the plurality of the objects; and learning a three-dimensional field in accordance with the captured image for obtaining virtual viewpoint data corresponding to a virtual viewpoint from the plurality of captured images by taking the learning area set for each object of the plurality of objects as a target, wherein a color difference is found between a captured image and a rendered image in a correspondence relationship with each other by taking a learning area of interest among the learning areas set for each object of the plurality of objects as a target and the three-dimensional field is updated so that the color difference becomes small, and wherein the updating is performed by finding the color difference between both images for each pixel in a correspondence relationship.

* * * * *